United States Patent
Beausoleil

(10) Patent No.: US 7,894,699 B2
(45) Date of Patent: Feb. 22, 2011

(54) PHOTONIC BASED INTERCONNECTS FOR INTERCONNECTING MULTIPLE INTEGRATED CIRCUITS

(75) Inventor: Raymond G. Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 133 days.

(21) Appl. No.: 11/582,207

(22) Filed: Oct. 16, 2006

(65) Prior Publication Data

US 2008/0089640 A1    Apr. 17, 2008

(51) Int. Cl.
| | |
|---|---|
| G02B 6/10 | (2006.01) |
| G02B 6/12 | (2006.01) |
| G02B 6/26 | (2006.01) |
| G02B 6/28 | (2006.01) |
| G02B 6/34 | (2006.01) |
| G02B 6/30 | (2006.01) |
| G02F 1/295 | (2006.01) |
| H04J 14/00 | (2006.01) |
| H04B 10/12 | (2006.01) |
| H04B 10/00 | (2006.01) |

(52) U.S. Cl. ............... 385/129; 385/9; 385/14; 385/15; 385/24; 385/37; 385/49; 385/130; 385/131; 385/132; 398/51; 398/54; 398/60; 398/68; 398/73; 398/141; 398/174; 398/176

(58) Field of Classification Search .......... 385/9, 385/14, 15, 24, 37, 129–132; 398/51, 54, 398/60, 68, 73, 141, 174, 176
See application file for complete search history.

(56) References Cited

U.S. PATENT DOCUMENTS

| | | | |
|---|---|---|---|
| 6,674,971 B1 * | 1/2004 | Boggess et al. | 398/139 |
| 7,251,386 B1 * | 7/2007 | Dickinson et al. | 385/14 |
| 2005/0078902 A1 * | 4/2005 | Beausoleil et al. | 385/1 |
| 2006/0034560 A1 | 2/2006 | Morris et al. | |
| 2006/0056758 A1 * | 3/2006 | Beausoleil et al. | 385/14 |

FOREIGN PATENT DOCUMENTS

| | | |
|---|---|---|
| WO | WO02/061473 | 8/2002 |
| WO | WO2004/079420 | 9/2004 |
| WO | WO2007/002449 | 1/2007 |
| WO | WO2007/087337 | 8/2007 |

* cited by examiner

*Primary Examiner*—Charlie Peng
*Assistant Examiner*—Hung Lam

(57) ABSTRACT

Various embodiments of the present invention are directed to photonic-based interconnects for transmitting data encoded in electromagnetic signals between electronic mosaics. In one embodiment of the present invention, a photonic-based interconnect comprises a first photonic node coupled to a second photonic node via a waveguide. The first photonic node is coupled to a first electronic mosaic and is configured to transmit electromagnetic signals encoding data generated by the first electronic mosaic to a second electronic mosaic and receive electromagnetic signals encoding data generated by the second electronic mosaic. The second photonic node is coupled to the second electronic mosaic and is configured to transmit electromagnetic signals encoding data generated by the second electronic mosaic to the first electronic mosaic and receive electromagnetic signals encoding data generated by the first electronic mosaic. The bus waveguide is configured to transmit electromagnetic signals between the first photonic node and the second photonic node.

20 Claims, 24 Drawing Sheets

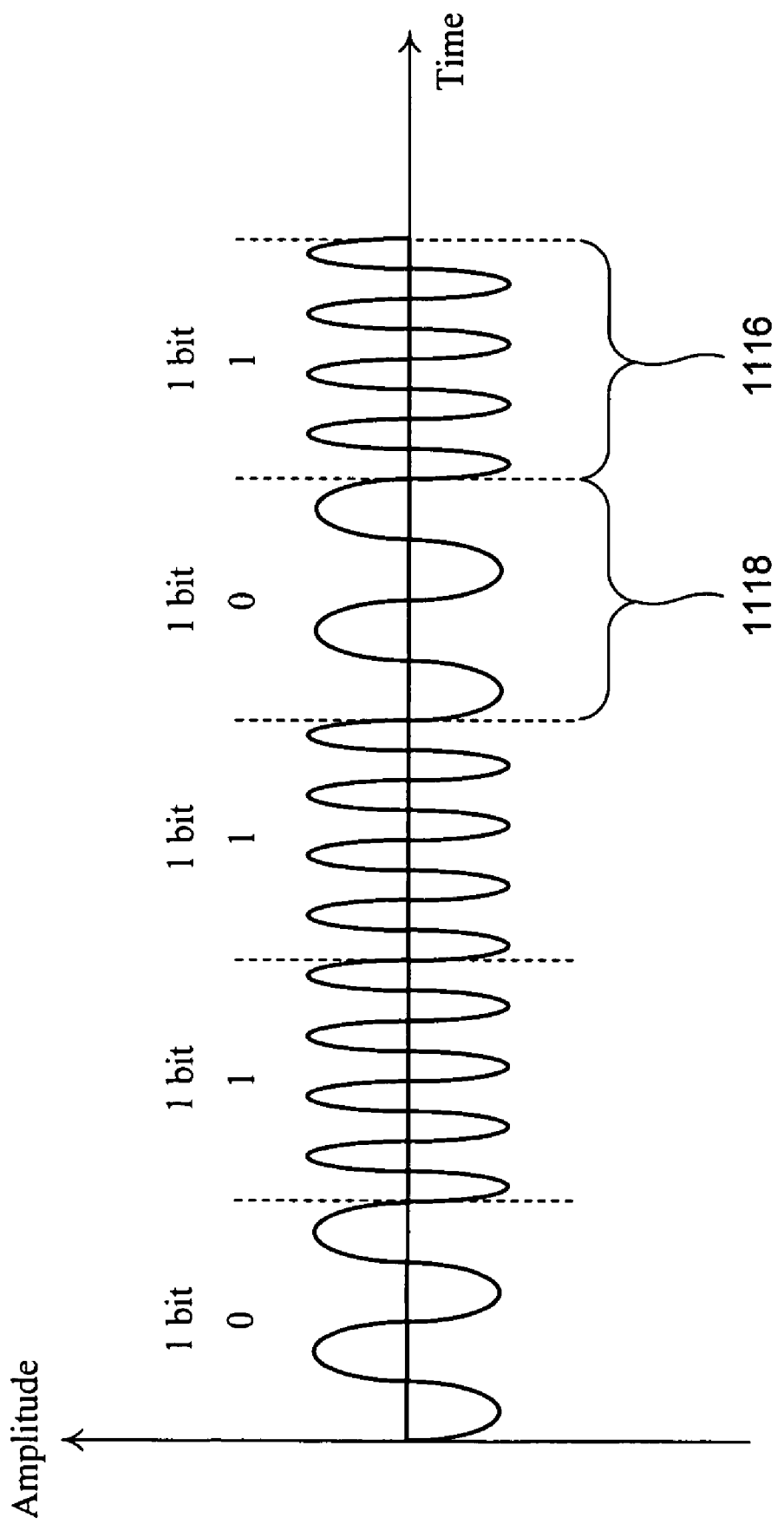

7,894,699 B2

PHOTONIC BASED INTERCONNECTS FOR INTERCONNECTING MULTIPLE INTEGRATED CIRCUITS

TECHNICAL FIELD

Embodiments of the present invention are related to photonic-based interconnects, and, in particular, to photonic-based interconnects for transmitting data encoded in electromagnetic signals between electronic mosaics.

BACKGROUND

In the mid 1960's, it was observed by semiconductor manufacturers that the number of transistors fabricated on integrated circuits ("chips") was doubling about every 18 months. This trend has continued and is now termed "Moore's Law." The number of transistors is viewed as a rough measure of computer processing power, which, in turn, corresponds to data processing speed. Another version of Moore's Law relates to memory capacity or the density of memory cells in memory chips. Although Moore's Law was originally made as an observation, over time Moore's Law has became widely accepted by the semiconductor industry as a goal for increasing computer processing power and memory capacity. As a result, semiconductor manufacturers have developed technologies for reducing the size of chip components to microscale and even nanoscale dimensions. These chips are typically embedded in packages, and the packages may be connected to other chips or electronic devices by way of signal wires patterned on a circuit board.

FIGS. 1A-1C illustrate an example chip and package with circuit board interconnects for transmitting data to other chips and devices. FIG. 1A illustrates a top view of an example chip 102 and package 104. The package 104 is connected to four separate sets of nine parallel signal wires 106-109, each set of signal wires is called a "wire bus." Each wire bus 106-109 transmits data in parallel between the chip 102 and other chips or devices (not shown) that may be located on the same circuit board or different circuit boards. For example, the wire bus 106 may be connected directly to a random access memory ("RAM") chip, which is located on the same circuit board (not shown), and the wire bus 108 may be connected to a sensor, which is located on a different circuit board (not shown).

FIG. 1B illustrates an enlargement of the chip 102 and the package 104 shown in FIG. 1A. The chip 102 includes a number of contact pads located near the perimeter of the chip 102, such as contact pad 110, and the package 104 includes a number of pins which are located around the perimeter of the package 104, such as pin 112. Each contact pad is connected to a single pin via a lead wire, and each pin is connected directly to a wire in a wire bus. For example, the contact pad 110 is connected to the pin 112 via a lead wire 114, and the pin 112 is connected to a bus wire 116. Each electrical signal transmitted or received by the chip 102 is carried by a contact pad, a lead wire, a pin, and one of the wires in a wire bus.

FIG. 1C illustrates a cross-sectional view of the chip 102 and the package 104 shown in FIG. 1B. As shown in FIG. 1C, the chip 102 and the package 104 are supported by a circuit board 118. The chip 102 comprises a Si transistor layer 120, a local interconnect 122, and a global interconnect 124. The Si transistor layer 120 comprises transistor components, electrical current sources, and drains (not shown). Vias in the local interconnect 122, such as via 126, interconnect devices in the Si transistor layer 120, and vias in the global interconnect 124 interconnect the Si transistor layer 120 to the contact pads. For example, via 128 interconnects the Si transistor layer 120 to the contact pad 110. The local interconnect 122 serves as a multiplexer by distributing signals between components of the Si transistor layer 120, and the global interconnect 124 serves a multiplexer by distributing signals generated within the Si transistor layer 120 to other chips or devices. For example, via 128 transmits signals to the contact pad 110, which is coupled to the wire 116 by way of the pin 112 and the lead wire 114.

In order for a first chip to transmit data to a second chip, the first chip multiplexes one or more signals encoding the data. The signals are multiplexed by the global interconnect around the perimeter of the first chip and transmitted to the second chip over the wire bus. Each wire in a wire bus carries one of the multiplexed signals. The global interconnect of the second chip demultiplexes the signals in order to obtain one or more signals that the second chip uses to process the data. FIG. 1D illustrates a wire bus interconnect between an example microprocessing ("CPU") chip 130 and an example RAM chip 132. A wire bus connecting the CPU chip 130 to the RAM chip 132 comprises 5 bus wires 134-138. Suppose the CPU chip 130 generates data to be stored temporarily in the RAM chip 132. The CPU chip 130 multiplexes the signal corresponding to the data by distributing the signal over contact pads 140. The distributed signal can then be transmitted over the bus wires 134-138 to the contact pads 142 of the RAM chip 132. The RAM chip demultiplexes the distributed signals received by contact pads 142 into fewer signals that can be used to store the data in one or more memory cells of the RAM chip 132.

Although recent semiconductor fabrication methods have made it possible to increase the density of transistors and memory cells in chips, the number of wires needed to interconnect these chips has increased, which has increased the need for larger circuit board surface areas and longer bus wires. As a result, the time needed to transmit data between chips, measured in chip clock cycles, has increased. Although semiconductor manufacturers have responded by developing techniques for reducing the cross-sectional dimensions of the wires so that more wires can be fit into smaller surface areas, there exist limitations on these cross-sectional dimensions. For example, as wire sizes decrease and more wires are packed into a smaller surface area, the number of interference effects increase, such as interference between signals transmitted on adjacent wires, and the number of thermal effects increase, because wire resistance increases as the wire cross-sectional dimensions decrease. These physical limitations make it unlikely that semiconductor manufacturers can continue to take advantage of the miniaturization offered by microscale and nanoscale semiconductor fabrication techniques. Furthermore, the intrinsic capacitance of the multiplexing and demultiplexing carried out at chip boundaries can greatly exceed the capacitance of the chip, which reduces signal speed transmission between chips. Manufacturers, designers, and users of computing devices have recognized a need for interconnects that provide high bandwidth and high-speed global interconnects between chips and other electronic devices.

SUMMARY OF THE INVENTION

Various embodiments of the present invention are directed to photonic-based interconnects for transmitting data encoded in electromagnetic signals between electronic mosaics. In one embodiment of the present invention, a photonic-based interconnect comprises a first photonic node coupled to a second photonic node via a waveguide. The first photonic node is coupled to a first electronic mosaic and is configured to transmit electromagnetic signals encoding data generated by the first electronic mosaic to a second electronic mosaic and receive electromagnetic signals encoding data generated by the second electronic mosaic. The second photonic node is coupled to the second electronic mosaic and is configured to transmit electromagnetic signals encoding data generated by the second electronic mosaic to the first electronic mosaic and receive electromagnetic signals encoding data generated by the first electronic mosaic. The bus waveguide is configured to transmit electromagnetic signals between the first photonic node and the second photonic node.

BRIEF DESCRIPTION OF THE DRAWINGS

FIGS. 11A-11E illustrate examples of information encoded in electromagnetic signals.

DETAILED DESCRIPTION OF THE INVENTION

Figure 1A:
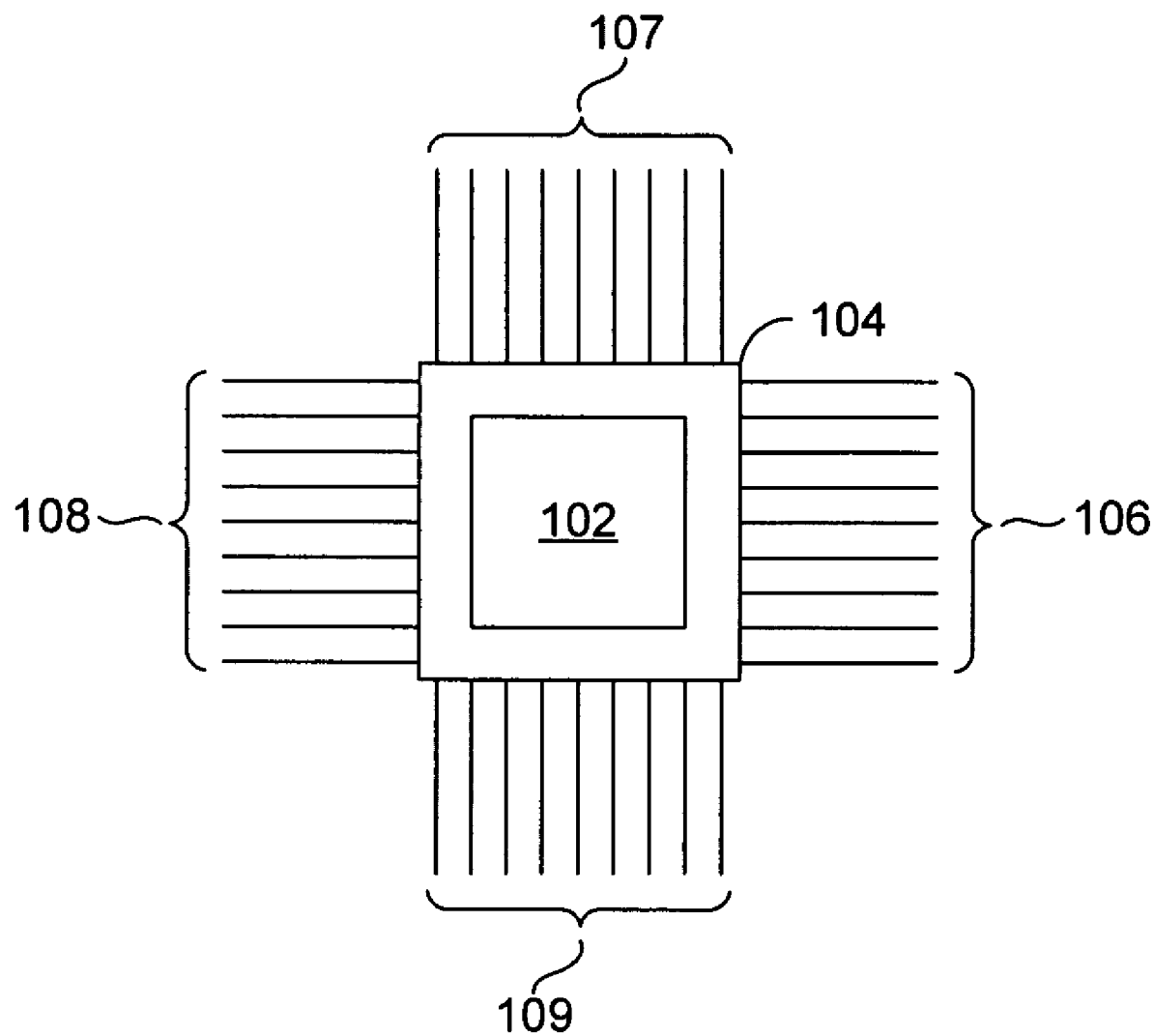
FIGS. 1A-1D illustrate views of an example chip interconnection components.
Figure 1B:
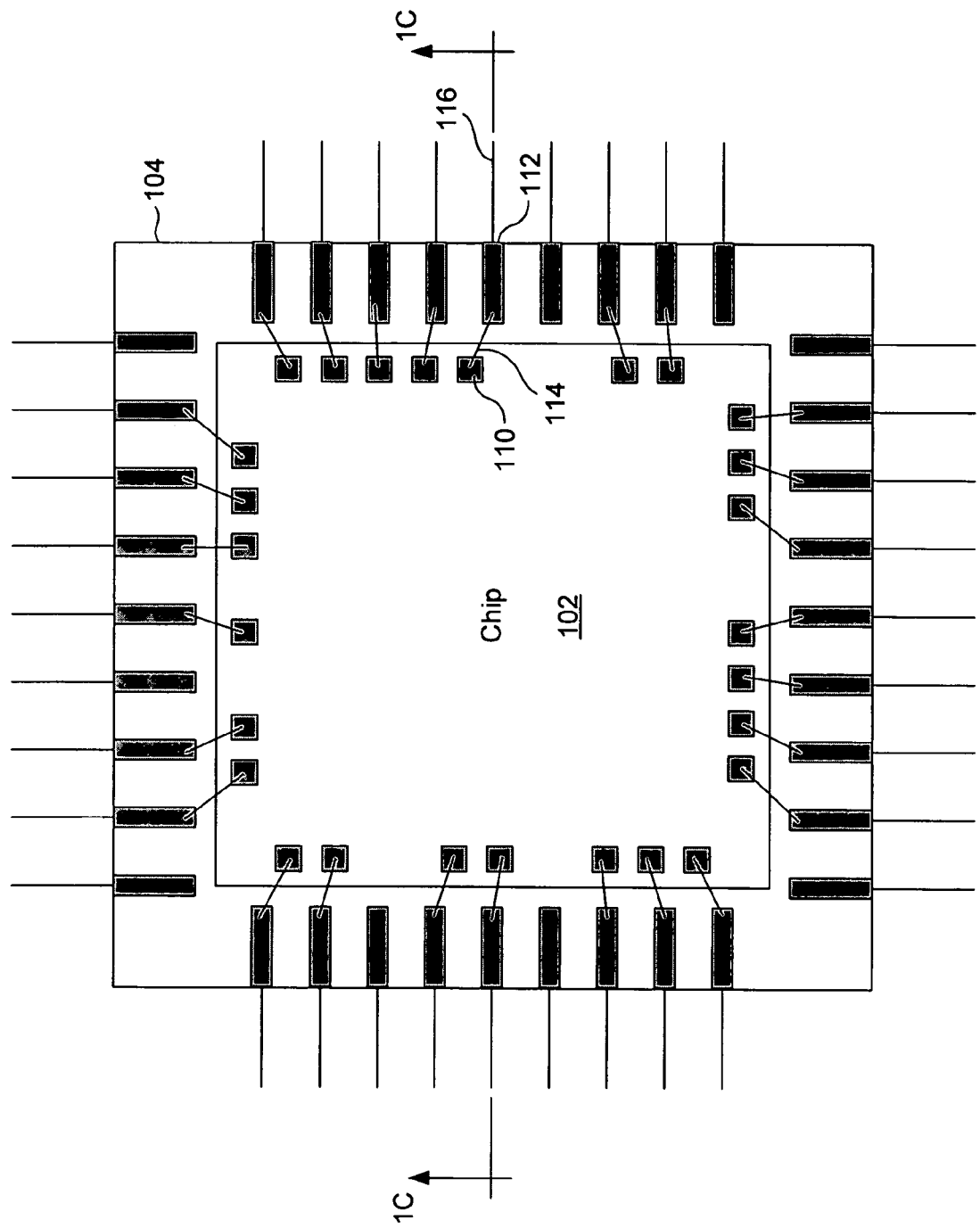
Figure 1C:
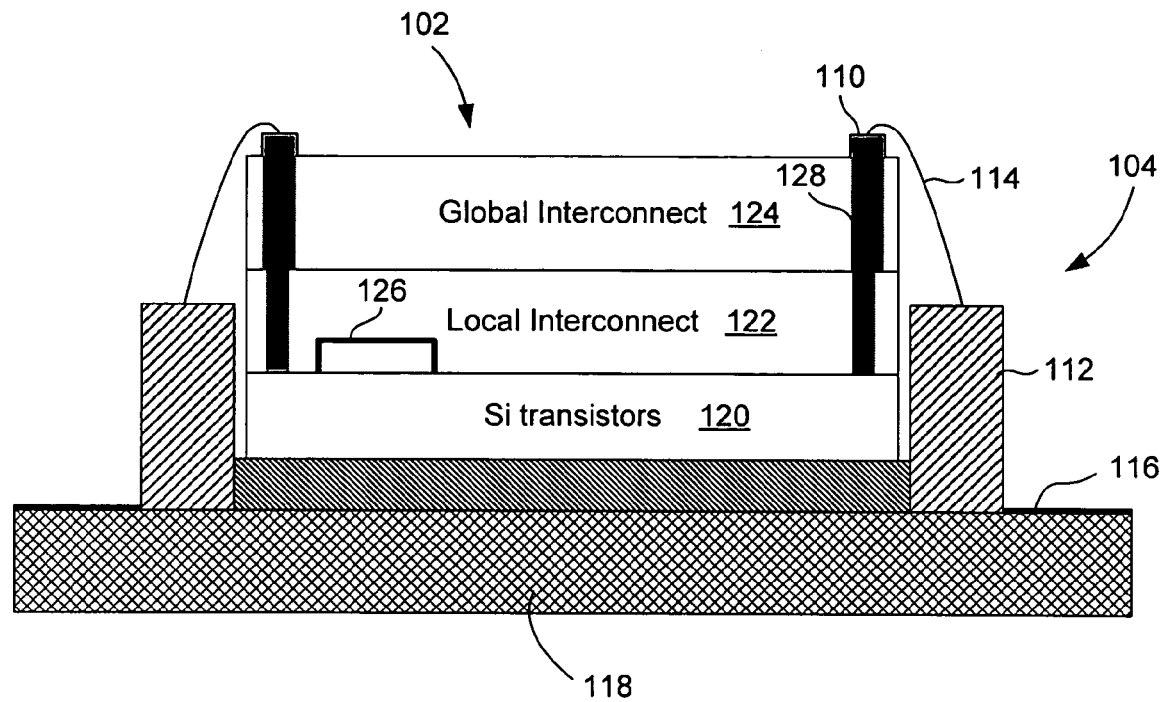
Figure 1D:
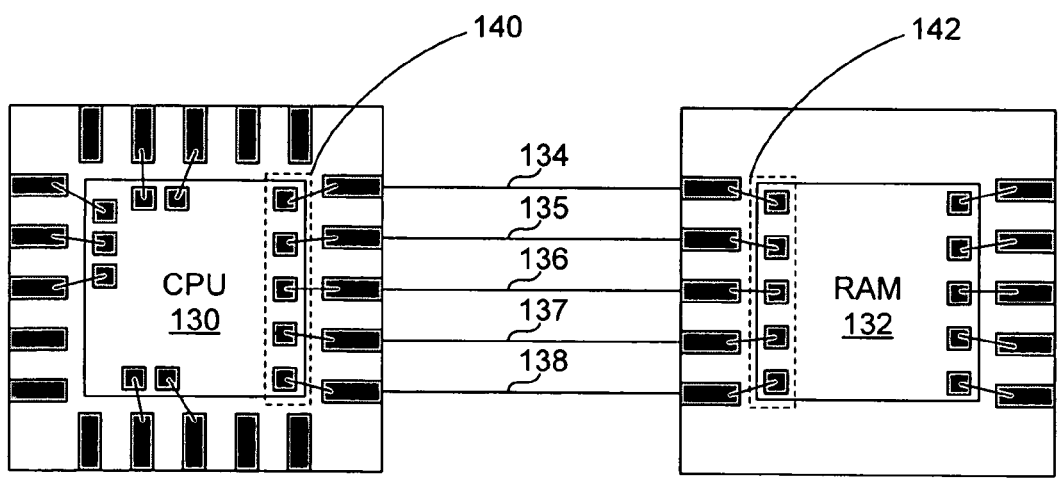

Various embodiments of the present invention are directed to photonic-based interconnects for transmitting data encoded in electromagnetic signals between subsystems of electronic mosaics. The term "subsystem" is used to refer to single, general-purpose integrated circuits, such as a CPU, memory, a sensor, or a logic cell. The term "electronic mosaic" is used to refer to a one or more interconnected subsystems. For example, the term "electronic mosaic" can be used to refer to a field programmable gate array ("FPGA"), which features a matrix of interconnected logic cells, or an application specific integrated circuit ("ASIC"), which features a number of different interconnected subsystems. The term "photonic" refers to devices that can be used to transmit either classical electromagnetic signals or quantized electromagnetic signals with wavelengths that span the electromagnetic spectrum. In other words, the term "photonic" as used to describe embodiments of the present invention is not limited to devices for transmitting single quanta, also called "photons," of electromagnetic signals.

Photonic-based interconnect embodiments of the present invention can be used to replace the global, wire-based interconnects used to interconnect subsystems that are part of different electronic mosaics. Transmitting data encoded in electromagnetic signals using photonic-based interconnects has a number of advantages over transmitting data encoded in electrical signals over wire-based interconnects. For example, electrical signals can be transmitted through Cu and Al wires at about c/3, where c represents the speed of light in free space (about 300,000 k/s). By contrast, electromagnetic signals propagating through photonic devices, such as optical fibers and photonic crystal waveguides, are transmitted at about c/1.5, which is about twice the speed allowed by wire-based interconnects. In addition, the bandwidth offered by photonic devices is much higher than a wire bus. For example, each wire in a wire bus can transmit a single electrical signal. By contrast, a single optical fiber can transmit about 100 or more electromagnetic signals.

In order to assist readers in understanding descriptions of various embodiments of the present invention, overview subsections of related topics are provided. An overview of photonic crystals and waveguides is provided in a first subsection. An overview encoding data in electromagnetic signals is provided in a second subsection. Finally, various system embodiments of the present invention are described in a third subsection.

An Overview of Photonic Crystals, Waveguides, and Resonant Cavities

Embodiments of the present invention employ concepts in photonic crystals, ridge waveguides, and other photonic devices. The textbooks *Fundamentals of Optical Waveguides*, by Katsunari Okamoto, Elsevier Inc. 2005, *Optical Waveguide Theory*, by Snyder and Love, Chapman and Hall, London, 1983, and *Photonic Crystals*, by Jean_Michel Lourtioz, Springer-Verlag, Berlin, 2005 are outstanding references in this field. In this subsection, topics in photonic crystals that relate to embodiments of the present invention are described. Additional details regarding ridge waveguides and other photonic devices can be obtained from the above-referenced textbooks, or from many other textbooks, papers, and journal articles related to this field.

Figure 2:
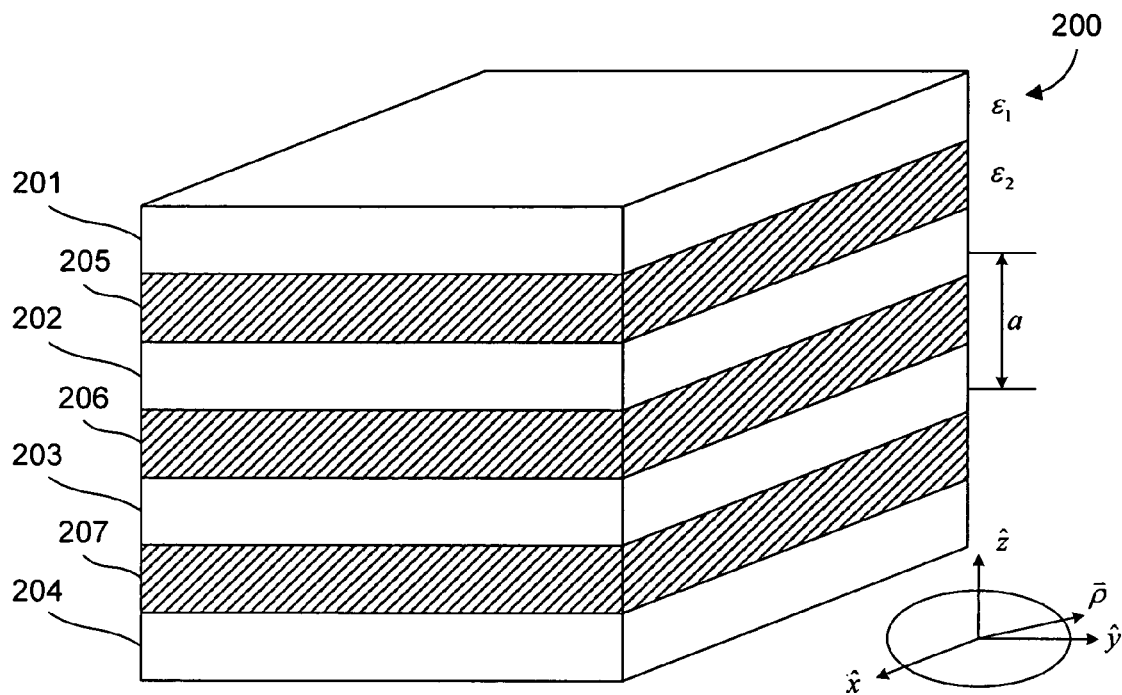
FIG. 2 illustrates an example of a one-dimensional photonic crystal.
Figure 3:
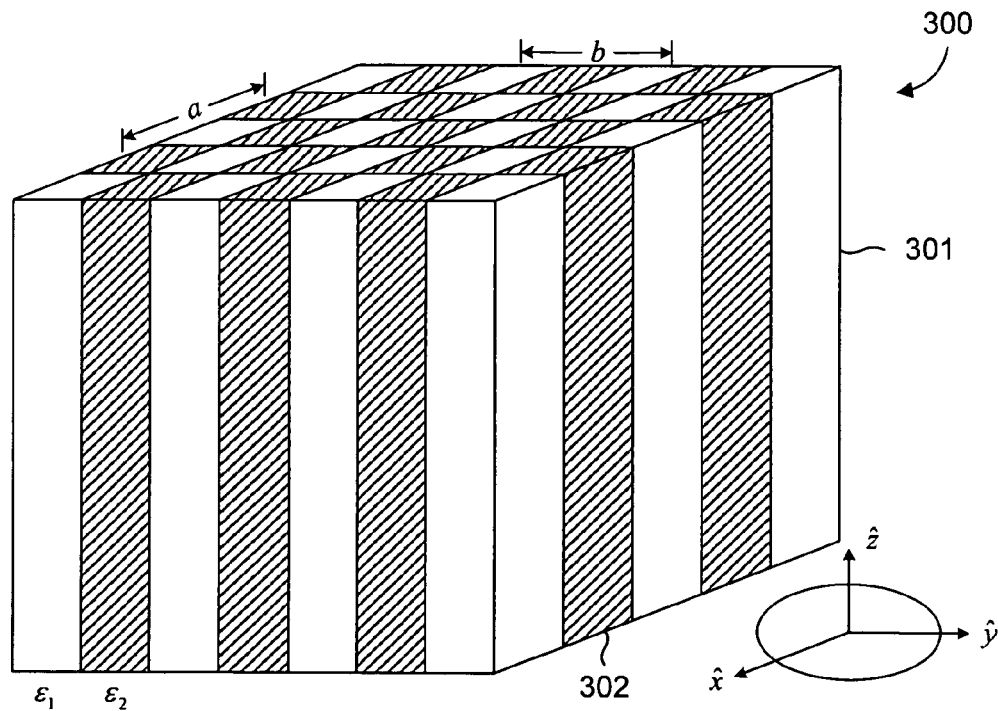
FIG. 3 illustrates an example of a two-dimensional photonic crystal.

Photonic crystals are photonic devices comprised of two or more different materials with dielectric properties that, when combined together in a regular pattern, can modify the propagation characteristics of electromagnetic radiation ("ER"). FIGS. 2 and 3 illustrate two of many different possible patterns in which two different materials with different dielectric properties can be combined to form a photonic crystal. Photonic crystals are typically identified by the number of directions in which the dielectric pattern is periodic. For example, FIG. 2 illustrates an example of a one-dimensional photonic crystal. In FIG. 2, a photonic crystal 200 is comprised of seven layers of two different dielectrics that alternate periodically in the z-direction. Unshaded layers 201-204 are comprised of a first dielectric having a dielectric constant $\in_1$, and hash-marked layers 205-207 are comprised of a second dielectric having a different dielectric constant $\in_2$. The layers are regularly spaced with a repeat distance called a "lattice constant," in the case of the lattice constant shown in FIG. 2, lattice constant a. FIG. 3 illustrates an example of a two-dimensional photonic crystal. The two-dimensional photonic crystal 300 comprises alternating layers of two different dielectrics, and is periodic in both the x-direction and the y-direction with two lattice constants a and b. Unshaded regions, such as region 301, are comprised of a first dielectric having dielectric constant $\in_1$, and hash-marked regions, such as region 302, are comprised of a second dielectric having a different dielectric constant $\in_2$. Photonic crystals can also be fabricated with repeating patterns in three dimensions. Three-dimensional photonic crystals can be fabricated using spheres, tubes, or other solid shapes comprising a first dielectric embedded in a slab comprising a second dielectric.

ER propagating in a dielectric can be characterized by electromagnetic waves comprising oscillating, orthogonal electric fields, $\vec{E}$, and magnetic fields, $\vec{H}$, and a direction of propagation, $\vec{k}$. The electric and magnetic fields are related by Maxwell's equations:

$$\nabla \cdot \vec{H}(\vec{r},t)=0 \qquad \text{Equation 1:}$$

$$\nabla \cdot \in(\vec{r})\vec{E}(\vec{r},t)=0 \qquad \text{Equation 2:}$$

$$\nabla \times \vec{E}(\vec{r},t) = -\frac{\partial \vec{H}(\vec{r},t)}{\partial t} \qquad \text{Equation 3}$$

$$\nabla \times \vec{H}(\vec{r},t) = \varepsilon(\vec{r})\frac{\partial \vec{E}(\vec{r},t)}{\partial t} \qquad \text{Equation 4}$$

where $\vec{r}$ is spatial displacement of an electromagnetic wave in the dielectric, t is time, and $\in(\vec{r})$ is a dielectric constant.

Because dielectrics do not generally support free charges or free currents, Equations 1-4 do not include a charge density term or a volume current density term. Equations 3 and 4, the curl equations, are linear differential equations. In both equations, the left sides express the dependence of a field on the independent spatial displacement $\vec{r}$, and the right sides express the dependence of a field on t. The only way for a differential quantity that varies with respect to $\vec{r}$ to remain equal to a quantity that varies with respect to t, is for the differential quantities to equal the same constant value. Both sides of Equations 3 and 4 are equal to a constant, and the method of separation of variables can be applied to obtain:

$$\vec{H}(\vec{r},t)=\vec{H}(\vec{r})\exp(i\omega t)$$

$$\vec{E}(\vec{r},t)=\vec{E}(\vec{r})\exp(i\omega t)$$

where ω is the angular frequency of an electromagnetic wave propagating in a dielectric.

Maxwell's curl Equations 3 and 4 can be decoupled by dividing Equation 4 by the dielectric constant $\in(\vec{r})$, applying the curl operator, and substituting Equation 3 for the curl of the electric field to give:

$$\Theta\vec{H}(\vec{r})=\omega^2\vec{H}(\vec{r}) \qquad \text{Equation 5:}$$

where $$\Theta = \nabla \times \left(\frac{1}{\varepsilon(r)}\nabla \times\right)$$

is a differential operator.

Equation 5 is an eigenvalue equation, where the eigenvalues are $\omega^2$, and the eigenfunctions are the corresponding magnetic fields $\vec{H}(\vec{r})$. After the magnetic fields $\vec{H}(\vec{r})$ are determined according to Equation 5, the electric field $\vec{E}(\vec{r})$ can be obtained by substituting $\vec{H}(\vec{r},t)$ into Equation 3 and solving for $\vec{E}(\vec{r})$.

For finite dimensional photonic crystals, such as the photonic crystals shown in FIGS. 1 and 2, the eigenvalues and eigenfunctions of Equations 5 are quantized to give:

$$\Theta\vec{H}_j(\vec{r})=\omega_j^2\vec{H}_j(\vec{r})$$

where j is a non-negative integer value called the "band index" that labels the harmonic modes of the magnetic field $\vec{H}(\vec{r})$ in order of increasing angular frequency.

The translational symmetry of the photonic crystal can be used to determine the functional form of the magnetic fields $\vec{H}_j(\vec{r})$. For example, the functional form of the magnetic fields $\vec{H}_j(\vec{r})$ propagating in the photonic crystal 200 are given by the following:

$$\vec{H}_{j,k_{II},k_z}(\vec{r})=\exp(i\vec{k}_{II}\cdot\vec{\rho})\exp(ik_z z)\vec{u}_{j,k_{II},k_z}(z) \qquad \text{Equation 6:}$$

where $\vec{\rho}$ is an xy-plane vector, $\vec{k}_{II}$ is an xy-plane wave vector, $k_z$ is a z-direction wave vector component, and $\vec{u}_{n,k_{II},k_z}(z)$ is a periodic function in the z-direction. The exponential term $\exp(i\vec{k}_{II}\cdot\vec{\rho})$ in Equation 6 arises from the continuous translational symmetry of ER propagating through the dielectric layers in the xy-plane. However, the term $\exp(ik_z z)\vec{u}_{j,k_{II},k_z}(z)$ in Equation 6 arises from Bloch's theorem and the discrete translational symmetry imposed in the z-direction by the periodicity of the dielectric constant of the photonic crystal 200, given by:

$$\in(\vec{r})=\in(\vec{r}+\vec{R})$$

where $\vec{R}=al\hat{z}$, a is a lattice constant determined by the regular pattern of the dielectric layers, and l is an integer.

The magnetic fields $\vec{H}_{j,k_{\parallel},k_z}(\vec{r})$ are periodic for integral multiples of $2\pi/a$. As a result, the associated angular frequencies are also periodic:

$$\omega_j(k_z) = \omega_j\left(k_z + \frac{m2\pi}{a}\right) \quad \text{Equation 7}$$

Differences in the dielectric pattern of a photonic crystal creates one or more range of frequencies $\omega_j$, referred to as "photonic bandgaps," for which ER is prevented from propagating in the photonic crystal. The photonic bandgap also corresponds to an electromagnetic energy range and a range of wavelengths, denoted by $\lambda_j$, for which the differences between the dielectrics prevents ER absorption and ER propagation. The wavelength $\lambda_j$ of ER transmitted through a photonic crystal is related to the angular frequency $\omega_j$:

$$\lambda_j = \frac{2\pi v}{\omega_j}$$

where v is the velocity of ER in the photonic crystal. Certain ER frequency ranges are not transmitted through a photonic crystal because high-frequency harmonic modes tend to concentrate electromagnetic energy in dielectric regions with a low dielectric constant, while low-frequency harmonic modes tend to concentrate electromagnetic energy in dielectric regions with a high dielectric constant. The electromagnetic energy, W, can be determined from the variational principle as follows:

$$W(\vec{H}) = \frac{1}{2(\vec{H},\vec{H})} \int d\vec{r} \frac{1}{\varepsilon(\vec{r})} |\nabla \times \vec{H}(\vec{r})|^2$$

where $(\vec{H},\vec{H}) = \int d\vec{r} \vec{H}(\vec{r})^* \vec{H}(\vec{r})$, and "*" represents the complex conjugate. The electromagnetic energy is lower for harmonic modes propagating in regions with a high dielectric constant than for modes propagating in regions of a photonic crystal with a low dielectric constant.

The size of and range of frequencies within a photonic bandgap of a one-dimensional photonic crystal depends on the relative difference between the dielectric constants of the dielectrics comprising a photonic crystal. One-dimensional photonic crystals with large relative differences between the dielectric constants of the materials comprising the photonic crystal have larger photonic bandgaps at higher frequency ranges than photonic crystals with smaller relative differences between the dielectric constants.

Figure 4A:
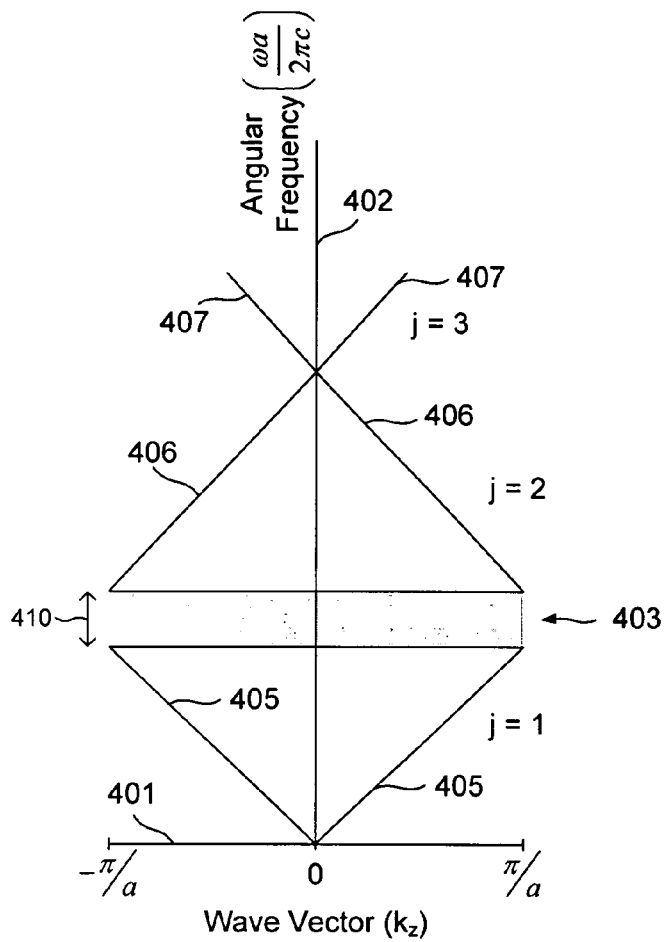
FIGS. 4A-4B are hypothetical plots of frequency versus wave vector z-component for a first one-dimensional photonic crystal and a second one-dimensional photonic crystal, respectively.
Figure 4B:
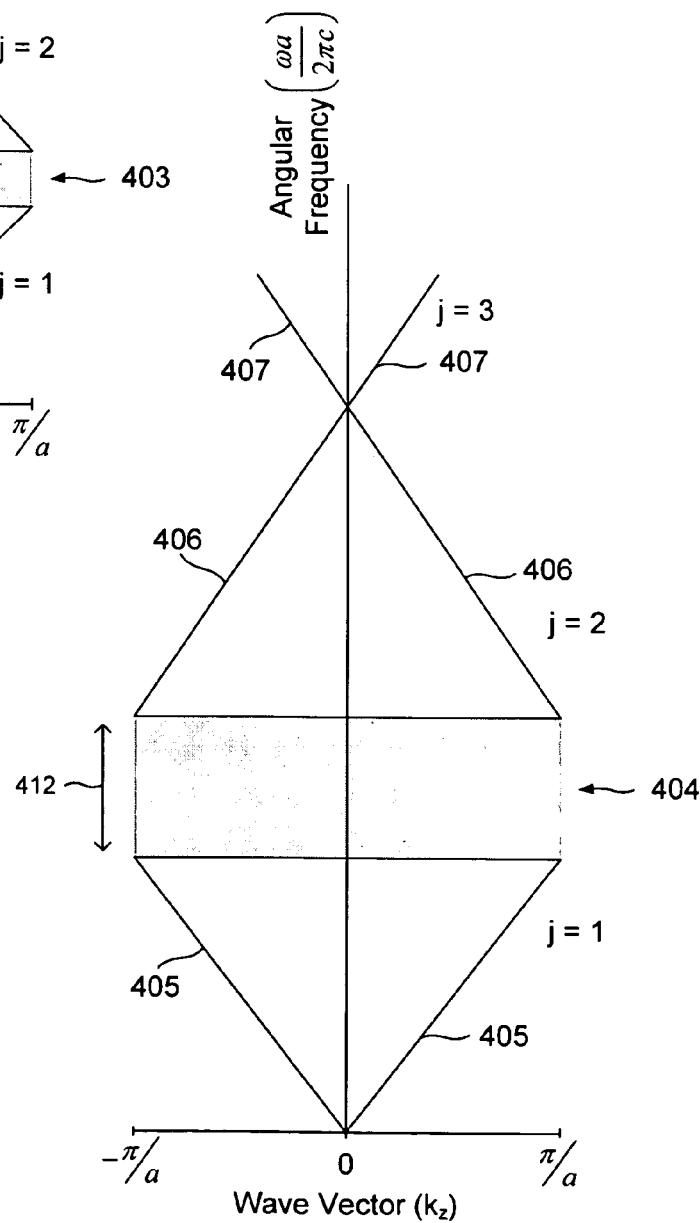

FIGS. 4A-4B are hypothetical plots of frequency ($\omega a/2\pi c$) versus wave vector z-component, $k_z$, for a first one-dimensional photonic crystal and a second one-dimensional photonic crystal, respectively. In FIGS. 4A-4B, horizontal axes, such as horizontal axis 401, correspond to wave vector z-component $k_z$, and vertical axes, such as vertical axis 402, correspond to the frequency. Because the frequencies $\omega_j$ are periodic, as described above with reference to Equation 7, frequencies ($\omega_j a/2\pi c$) are plotted with respect to wave vector z-component range $-\pi/a$ and $\pi/a$ for angular frequency bands j equal to 1, 2, and 3. The photonic bandgaps are identified by shaded regions 403 and 404. Lines 405, 406, and 407 correspond to the first, second, and third angular frequency bands (j=1, 2, and 3). The width 410 of the photonic bandgap 403, in FIG. 4A, is smaller than the width 412 of the photonic bandgap 404, in FIG. 4B, because the relative difference between the dielectric constants of the materials comprising the first photonic crystal is smaller than the relative difference between the dielectric constants of materials comprising the second photonic crystal. Also, the photonic bandgap 403 covers a lower range of frequencies than the range of frequencies covered by photonic bandgap 404.

Figure 5:
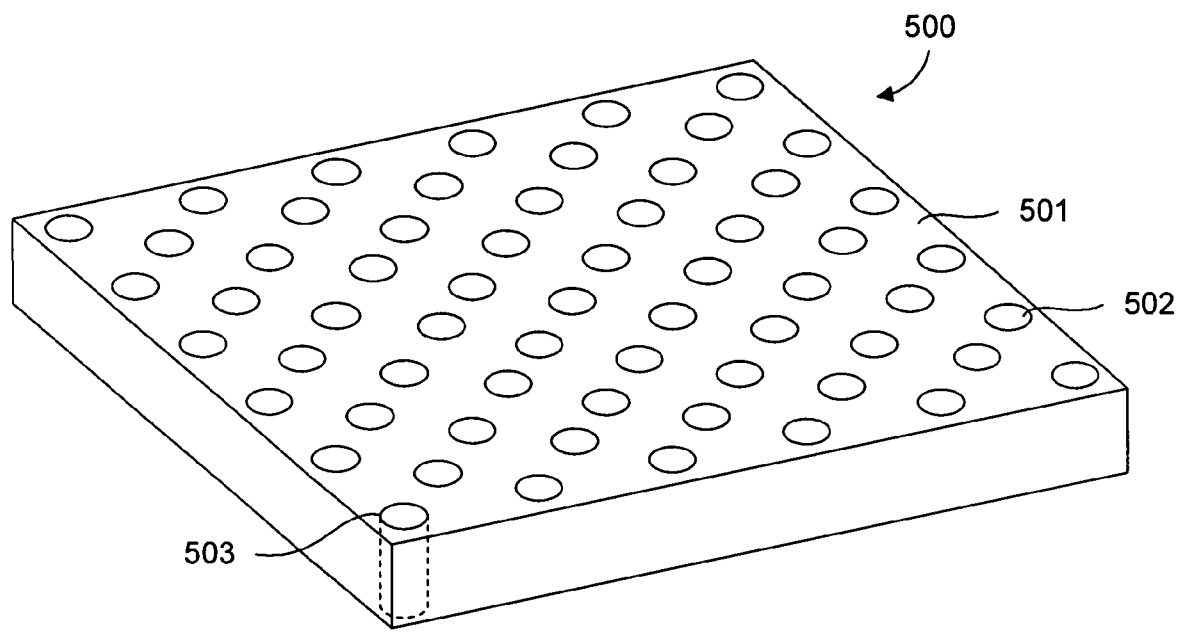
FIGS. 5-6 illustrate perspective views of two two-dimensional photonic crystals.
Figure 6:
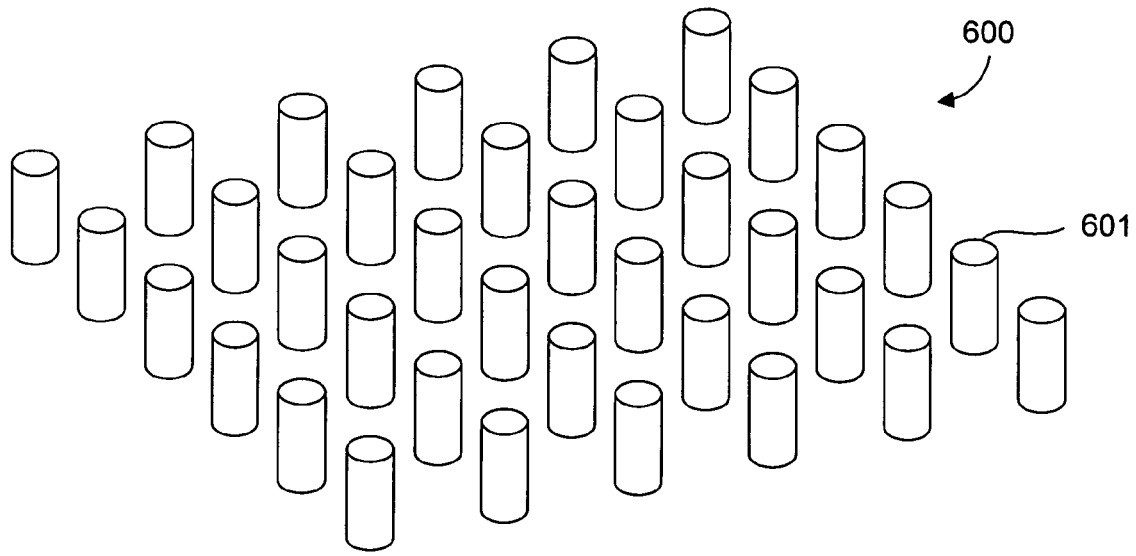

Two-dimensional photonic crystals can be comprised of a regular lattice of cylindrical holes fabricated in a dielectric slab. The cylindrical holes can be air holes or holes filled with a dielectric material different from the dielectric material of the photonic slab. FIG. 5 illustrates a perspective view of a two-dimensional photonic crystal. In FIG. 5, a photonic crystal 500 is comprised of a dielectric slab 501 with a regular lattice of embedded cylindrical holes, such as column 502. The cylindrical holes extend from the top surface to the bottom surface of the slab 501, as indicated by a cylindrical hole 503, and can be holes filled with air or any other material having a dielectric constant different from the dielectric constant of the slab 501. Two-dimensional photonic crystals can also be comprised of a regular lattice arrangement of cylindrical columns surrounded by a gas or a liquid. FIG. 6 illustrates a two-dimensional photonic crystal 600 having a regular square lattice of solid cylindrical columns, such as a cylindrical column 601, surrounded by fluid, such as gas or liquid, with a dielectric constant different from the cylindrical columns.

Figure 7A:
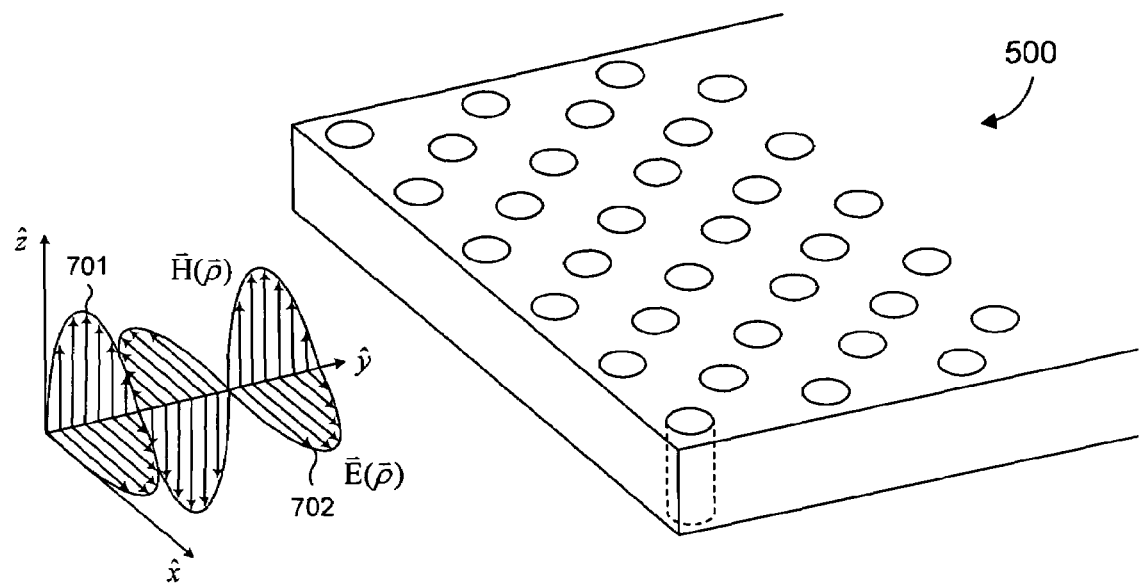
FIGS. 7A-7B illustrate propagation of a transverse electric field and magnetic field modes in the two-dimensional photonic crystal shown in FIG. 5.
Figure 7B:
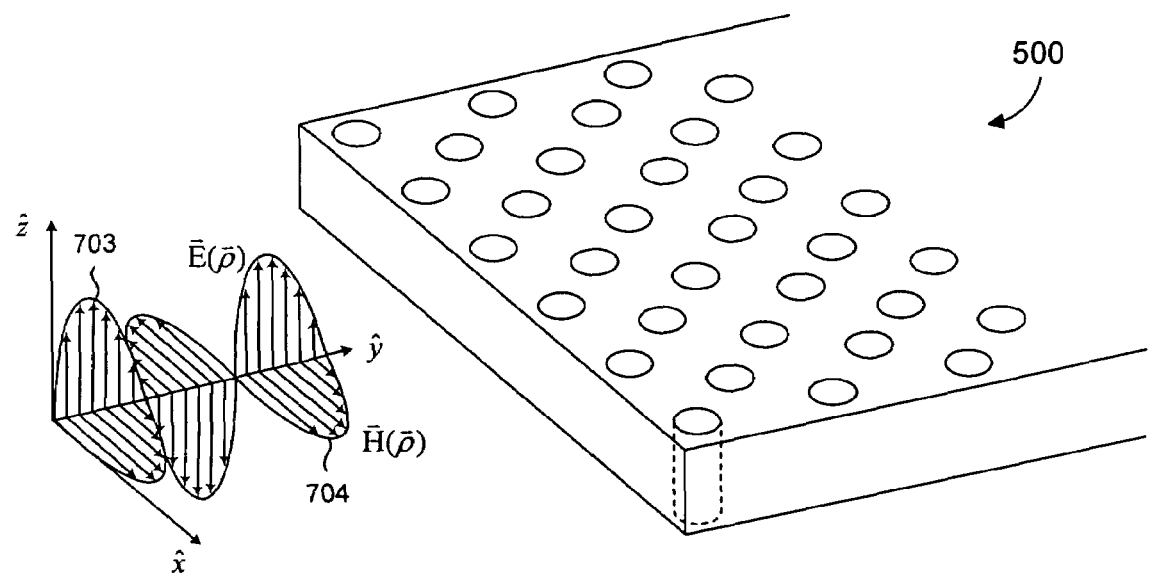

Two-dimensional photonic crystals polarize ER propagating in the periodic plane of the photonic crystal, and the electric and magnetic fields can be classified into two distinct polarizations: (1) the transverse electric-field ("TE") modes; and (2) the transverse magnetic-field ("TM") modes. The TE have $\vec{H}(\vec{\rho})$ directed normal to the periodic plane of the photonic crystal and $\vec{E}(\vec{\rho})$ directed in the periodic plane of the photonic crystal, while the TM have $\vec{E}(\vec{\rho})$ directed normal to the periodic plane of the photonic crystal and $\vec{H}(\vec{\rho})$ directed in the periodic plane of the photonic crystal. FIGS. 7A-7B illustrate propagation of TE and TM modes in the two-dimensional photonic crystal shown in FIG. 5. The periodic plane of the photonic crystal 500 lies in the xy-plane, the cylindrical holes are parallel to the z-direction, and ER propagates through the photonic crystal 500 in the y-direction. In FIG. 7A, an oscillating curve 701 represents the $\vec{H}(\vec{\rho})$ mode directed normal to the xy-plane, and an oscillating curve 702 represents the orthogonal $\vec{E}(\vec{\rho})$ mode directed in the xy-plane. In FIG. 7B, an oscillating curve 703 represents the $\vec{E}(\vec{\rho})$ mode directed normal to the xy-plane, and an oscillating curve 704 represents the orthogonal $\vec{H}(\vec{\rho})$ mode directed in the xy-plane.

Figure 8:
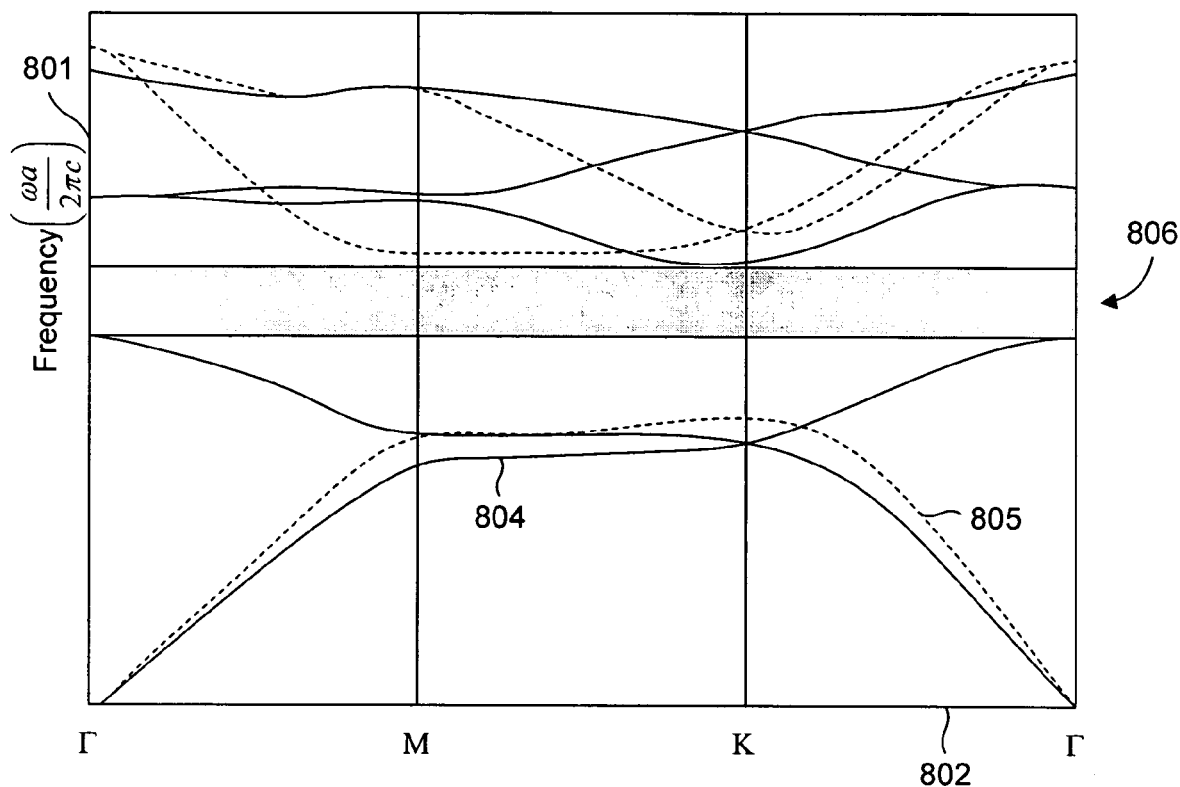
FIG. 8 illustrates a photonic band structure of transverse electric field and magnetic field modes propagating in the two-dimensional photonic crystal shown in FIG. 5.
Figure 8:
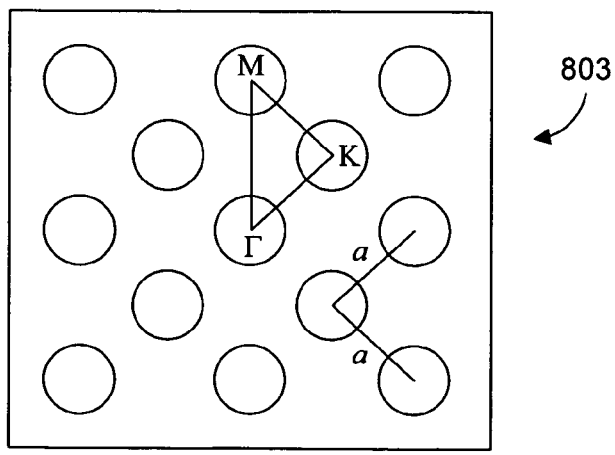

FIG. 8 illustrates a photonic band structure of TM and TE modes of an ER propagating in the photonic crystal shown in FIG. 5. In FIG. 8, a vertical axis 801 represents the angular frequency of ER propagating in the photonic crystal 500, and a horizontal axis 802 represents the ER propagation paths between lattice points labeled Γ, M, and K in a photonic crystal segment 803 of the photonic crystal 500, shown in FIG. 5. Solid lines, such as solid line 804, represent TM modes, and dashed lines, such as dashed line 805, represent the TE modes. A shaded region 806 identifies a photonic bandgap in which neither the TE nor TM modes are permitted to propagate in the photonic crystal 500.

The width and the frequency range covered by photonic bandgaps in two-dimensional photonic crystal slabs, such as the photonic bandgap 806, depends on the periodic spacing of the cylindrical holes, represented by lattice constant a, and the relative difference between the dielectric constant of the slab and the dielectric constant of the cylindrical holes. Also, the frequency range covered by photonic bandgap 806 can be shifted to a higher frequency range for larger relative differences between the dielectric constant of the slab and the dielectric constant of the cylindrical holes, while the photonic bandgap 806 can be shifted to a lower frequency range for smaller relative differences between the dielectric constant of the slab and the dielectric constant of the cylindrical holes.

Two-dimensional photonic crystals can be designed to reflect ER within a specified frequency band. As a result, a two-dimensional photonic crystal can be designed and fabricated as a frequency-band stop filter to prevent the propagation of ER having frequencies within the photonic bandgap of the photonic crystal. Generally, the size and relative spacing of cylindrical holes control which wavelengths of ER are prohibited from propagating in the two-dimensional photonic crystal. However, defects can be introduced into the lattice of cylindrical holes to produce particular localized components. In particular, a point defect, also referred to as a "resonant cavity," can be fabricated to provide a resonator that temporarily traps a narrow range of frequencies or wavelengths of ER. A line defect, also referred to as a "waveguide," can be fabricated to transmit ER with frequency ranges or wavelengths that lie within a frequency range of a photonic bandgap. As a result, a three-dimensional photonic crystal slab can be thought of as two-dimensional crystal having a refractive index n that depends on the thickness of the slab.

Figure 9:
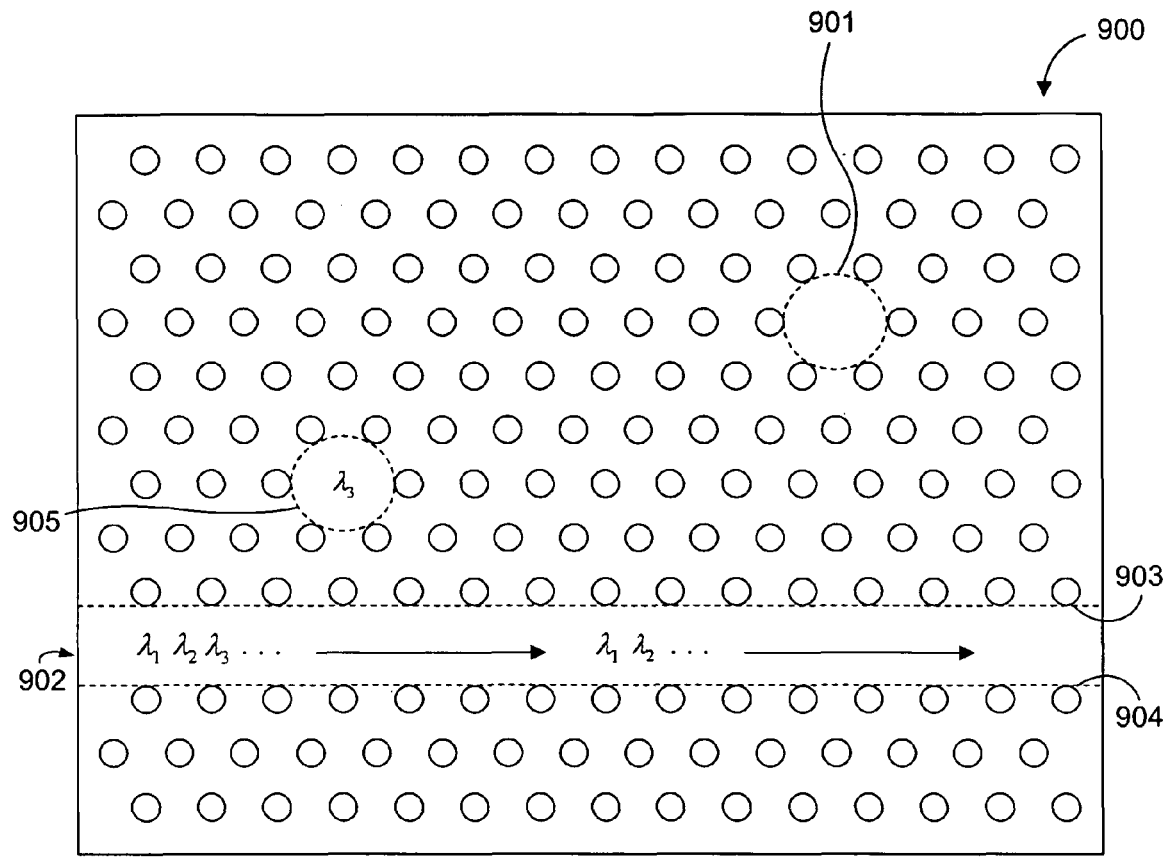
FIG. 9 illustrates an example of a photonic crystal with two resonant cavities and a waveguide.

FIG. 9 illustrates an example of a photonic crystal with two resonant cavities and a waveguide. A resonant cavity can be created in a two-dimensional photonic crystal slab by omitting, increasing, or decreasing the size of a select cylindrical hole. For example, a resonant cavity 901 is created in a photonic crystal 900 by omitting a cylindrical hole, as indicated by the empty region surrounded by a dashed-line circle. Resonant cavities 901 and 905 are surrounded by effectively reflecting walls that temporarily trap ER in the frequency range of the photonic bandgap. Resonant cavities can channel ER within a narrow frequency band in a direction perpendicular to the plane of the photonic crystal. For example, the resonant cavity 901 can trap localized TM modes and TE modes within a narrow frequency band of the photonic bandgap. Unless the photonic crystal 900 is sandwiched between two reflective plates or dielectrics that create total internal reflection, the ER resonating in the resonant cavity 901 can escape in the direction perpendicular to the periodic plane of the photonic crystal 900. Each resonant cavity has an associated quality ("Q") factor that provides a measure of how many oscillations take place in a cavity before the ER leaks into the region surrounding the resonant cavity.

Waveguides are optical transmission paths that can be used to direct ER within a particular frequency range of the photonic bandgap from a first location in a photonic crystal to a second location in the photonic crystal. Waveguides can be fabricated by changing the diameter of certain cylindrical holes within a column or row of cylindrical holes, or by omitting rows of cylindrical holes. For example, in the photonic crystal 900, a dielectric waveguide 902 is created by omitting an entire row of cylindrical holes during fabrication of the photonic crystal 900, as indicated by the empty region between dashed lines 903 and 904. The dielectric waveguide 902 transmits ER with wavelengths $\lambda_0$ and $\lambda_1$ along a single path. Networks of branching waveguides can be used to direct ER in numerous different pathways through the photonic crystal. The diameter of an electromagnetic signal propagating along a waveguide can be as small as $\lambda/3n$, where n is the refractive index of the waveguide, while a harmonic mode volume of a resonant cavity can be as small as $2\lambda/3n$.

Waveguides and resonant cavities may be less than 100% effective in preventing ER from escaping into the area immediately surrounding the waveguides and resonant cavities. For example, ER within a frequency range in the photonic bandgap propagating along a waveguide also tends to diffuse into the region surrounding the waveguide. ER entering the area surrounding a waveguide or a resonant cavity experiences an exponential decay in amplitude, a process called "evanescence." As a result, a resonant cavity can be located within a short distance of a waveguide to allow certain wavelengths of ER carried by the waveguide to be extracted by the resonant cavity. In effect, resonant cavities are filters that can be used to extract a fraction of a certain wavelength of ER propagating in the waveguide. Depending on a resonant cavity Q factor, an extracted ER can remain trapped in a resonant cavity and resonate for a time before leaking into the surroundings or backscattering into the waveguide. For example, in FIG. 9, the resonant cavity 901 is located too far from the waveguide 902 to extract a mode with particular wavelength of ER. However, the resonant cavity 905 is able to extract a fraction of ER with wavelength $\lambda_3$ propagating along the waveguide 902. Thus, a smaller fraction of ER with wavelength $\lambda_3$ may be left to propagate in the waveguide 902 along with ER of wavelengths $\lambda_1$ and $\lambda_2$.

Figure 10:
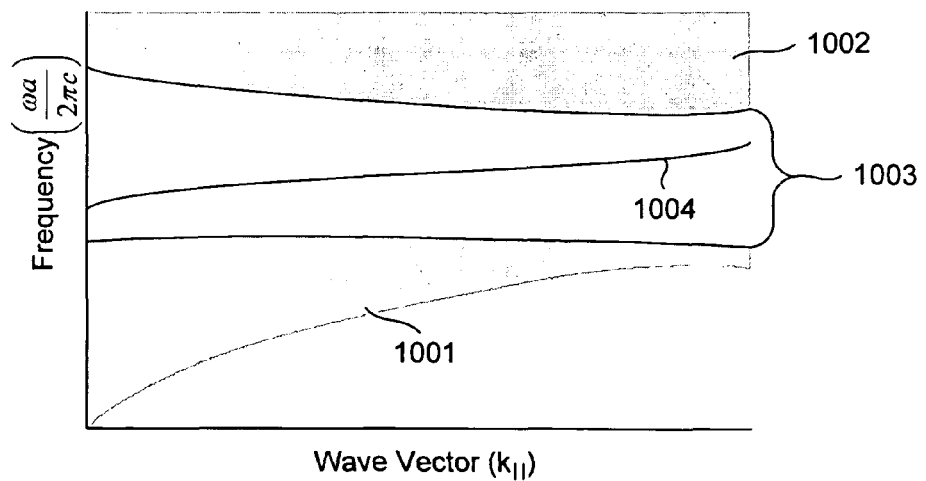
FIG. 10 is a hypothetical plot of frequency versus the magnitude of wave vector for the waveguide of the photonic crystal shown in FIG. 9.

FIG. 10 is a hypothetical plot of frequency versus the magnitude of wave vector $\vec{k}_{||}$ for the waveguide of the photonic crystal shown in FIG. 9. In FIG. 10, shaded regions 1001 and 1002 represent projected first and second band structures of the photonic crystal 900 in the absence of the waveguide 902, shown in FIG. 9. A region 1003 identifies the photonic bandgap created by the photonic crystal 900. Line 1004 identifies a band of frequencies permitted to propagate in the waveguide 902. The number of frequency bands permitted to propagate in waveguide 902 can be increased by increasing the size of the waveguide 902. For three-dimensional photonic crystals, the three-dimensional lattice parameters, the difference between dielectric constants, and the dimensions of the inclusions determine the frequency range of photonic bandgaps. Waveguides and resonant cavities can also be fabricated in three-dimensional photonic crystals by selectively removing or changing the dimensions of certain inclusions.

An Overview of Encoding Data in Electromagnetic Radiation

Figure 11A:
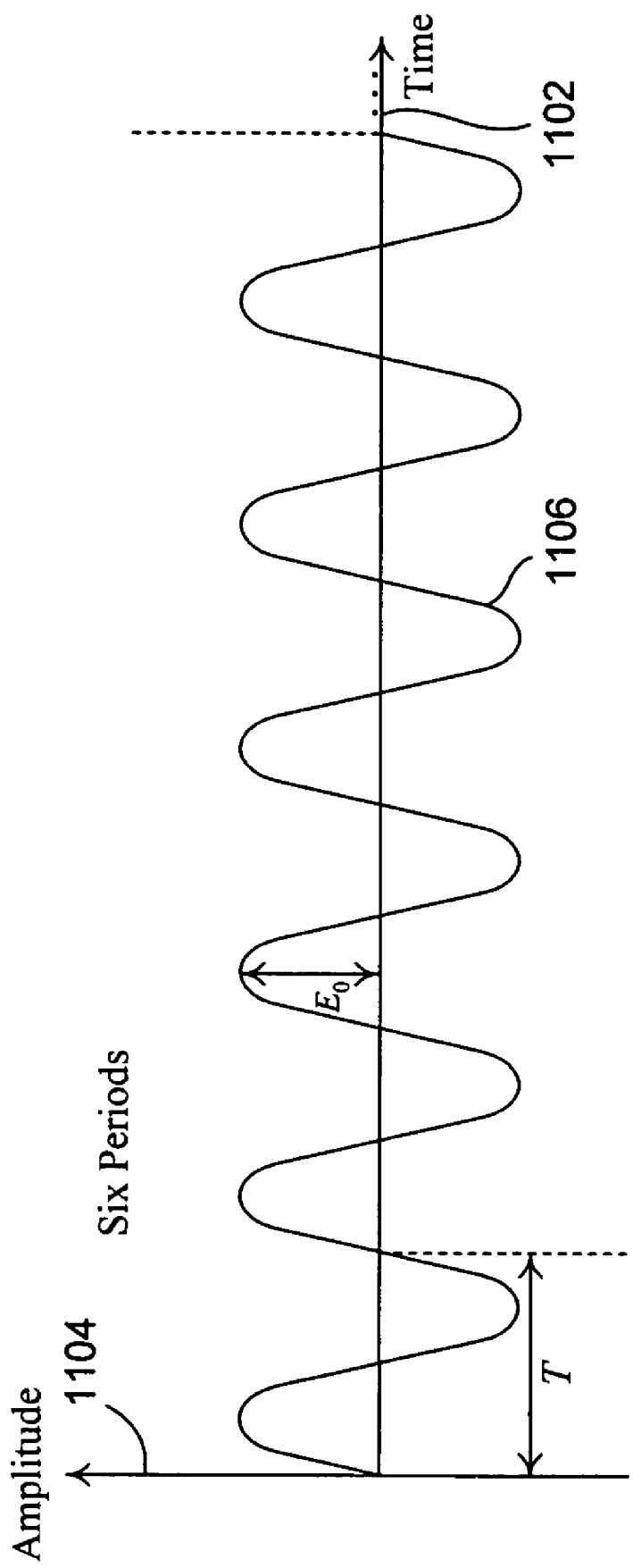

A bit is a basic unit of information in computational systems and is equivalent to a choice between two alternatives, such as "YES" and "NO," or "ON" and "OFF." The two states for a bit are typically represented by the numbers 1 or 0. Information can be encoded in an electromagnetic wave by modulating the electromagnetic wave amplitude frequency, or phase. The modulated electromagnetic waves can then be transmitted over large distance in optical fibers, waveguides, or through free space, and decoded by a demodulator. However, most electromagnetic wave interactions with matter result from the electric field component rather than the magnetic field component, because the interaction of the magnetic field with ordinary matter is smaller than that of the electric field by the factor 1/c, where c represents the speed of light. As a result, and for the sake of simplicity, an electromagnetic wave can be represented by the electric field component:

$$E(z,t) = E_0 \cos(zk - \omega t)$$

where the electric field propagates in the z direction, $\omega$ is angular frequency, k is a wavevector $\omega/c$, t is time, and $E_0$ is the amplitude. FIG. 11A is a plot of an electromagnetic wave as a function of time and a fixed observation point. In FIG. 11A, horizontal line 1102 is a time axis, vertical line 1104 is the amplitude $E_0$, and curve 1106 represents the electric field E(z,t). The period T is the time it takes for the electromagnetic signal to complete a cycle. The angular frequency $\omega$ is $2\pi\upsilon$, where $\upsilon$, which is equal to 1/T, is the frequency, or number of times, the electromagnetic field completes a cycle per unit of time.

Figure 11B:
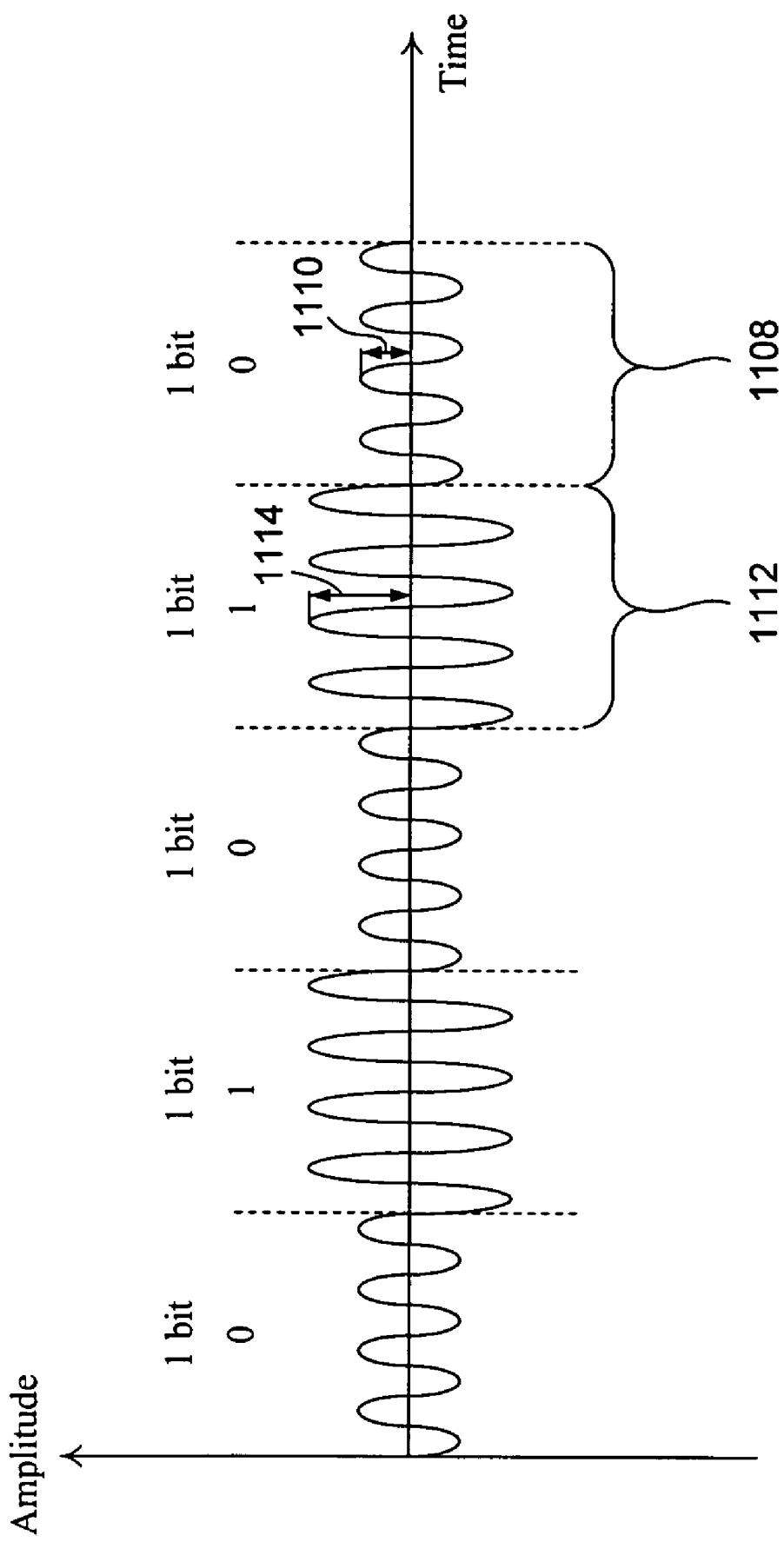
Figure 11D:
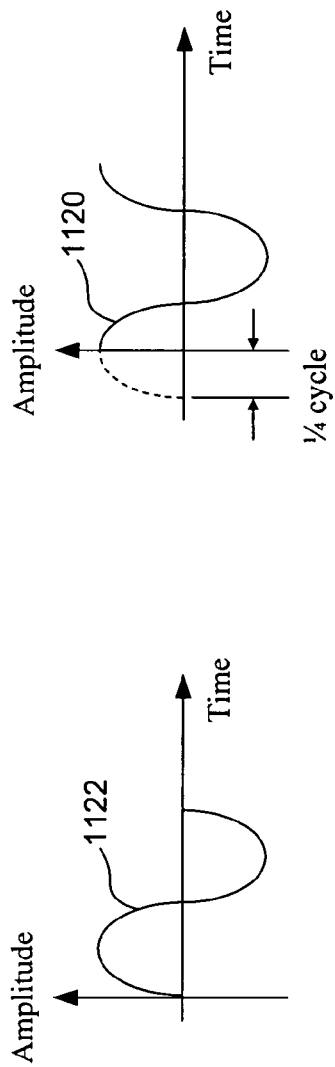
Figure 11E:
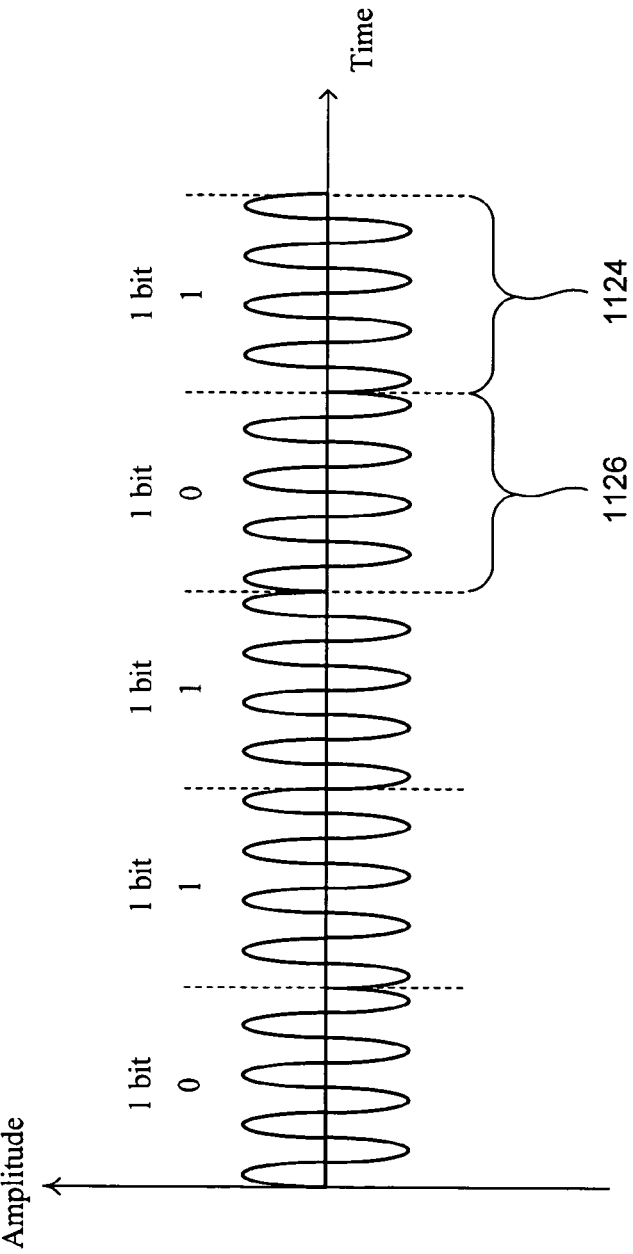

Amplitude modulation is used to encode information by changing the strength or magnitude of the amplitude of the electromagnetic signal. FIG. 11B illustrates an example of an amplitude modulated electromagnetic signal encoding of the bits "0" and "1." In FIG. 11B, a bit corresponds to four consecutive cycles of the signal, where the cycles 1108 with a small amplitude 1110 corresponds to the bit "0," and the cycles 1112 with a relatively large amplitude 1114 corresponds to the bit "1." Frequency modulation is used to encode information by varying the frequency of the electromagnetic signal. FIG. 11C illustrates an example of a frequency modulated electromagnetic signal encoding of the bits "0" and "1." In FIG. 11C, the four consecutive cycles 1116 correspond to the bit "1," and the two consecutive cycles 1118 corresponds to the bit "0." Phase modulation is used to encode information by shifting the phase of the electromagnetic signal as follows:

$$E(z,t)=E_0 \cos(zk-\omega t+\phi)$$

where $\phi$ represents a phase shift. A phase shift corresponds to a shift in the waveform of the electromagnetic signal. For example, FIG. 11D illustrates a curve 1120 that includes a ¼ cycle phase shift of a curve 1122. FIG. 11E illustrates an example of a phase modulated electromagnetic signal encoding of the bits "0" and "1." In FIG. 11E, the cycles 1124 corresponds to a bit "1," and the cycles 1126 includes a ½ cycle phase shift that corresponds to the bit "0." The electromagnetic signals can also be modulated for telecommunications signals. For example, electromagnetic signals can be modulated for a return-to-zero or non-return-to-zero line codes in telecommunication signals.

EMBODIMENTS OF THE PRESENT INVENTION

Figure 12:
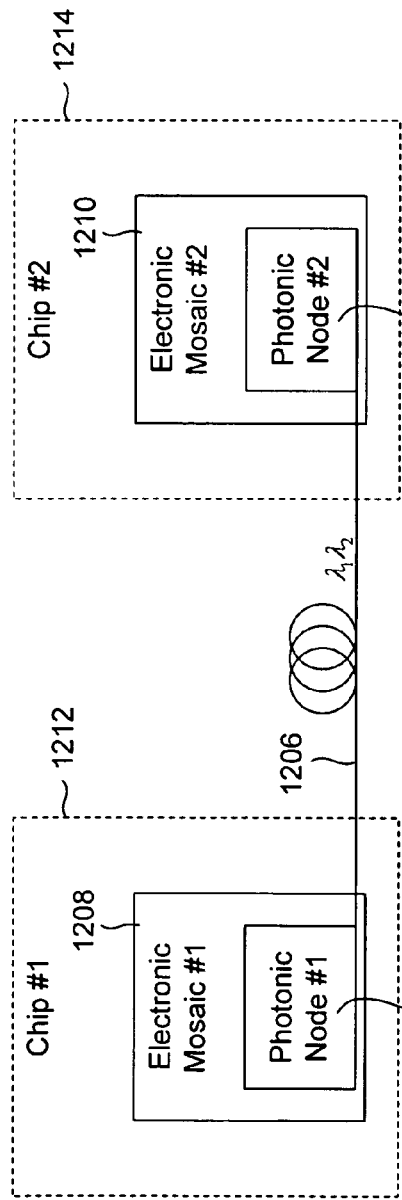
FIG. 12 illustrates a first photonic-based interconnect for interconnecting two electronic mosaics that represents an embodiment of the present invention.

FIG. 12 illustrates a first photonic-based interconnect for interconnecting two electronic mosaics that represents an embodiment of the present invention. In FIG. 12, the photonic-based interconnect comprises a first photonic node 1202, a second photonic node 1204, and a waveguide 1206. The first photonic node 1202 is interconnected to the second photonic node 1204 via the waveguide 1206. The waveguide 1206 can be a photonic crystal waveguide or an optical fiber with a length ranging from about 1 micron to tens, hundreds, and even thousands of kilometers. Interconnecting the waveguide 1206 to the photonic nodes 1202 and 1204 is described below with reference to FIG. 21. The first photonic node 1202 may be coupled to a subsystem of a first electronic mosaic 1208, and the second photonic node 1204 may be coupled to a subsystem of a second electronic mosaic 1210. The first and second electronic mosaics 1208 and 1210 an ASICs, FPGAs, or a combination of general purpose integrated circuits, such as CPUs, logic cells, memory, and sensors.

The electronic mosaics 1208 and 1210 and corresponding coupled photonic nodes 1202 and 1204 are identified in FIG. 12 as a first chip 1212 and a second chip 1214, respectively. The chips 1212 and 1214 are functionally equivalent to conventional chips incorporating the same electronic mosaics 1208 and 1210. As described above with reference to FIGS. 1A-1D, these conventional chips can be embedded in packages, connected to wire buses that are located on circuit boards, and perform multiplexing and demultiplexing at chip boundaries. However, the photonic-based interconnect shown in FIG. 12 eliminates the need for packages and multiplexing and demultiplexing at chip boundaries. In other words, the photonic-based interconnect eliminates the time delay due to multiplexing and demultiplexing at conventional chip boundaries.

Both the first photonic node 1202 and the second photonic node 1204 operate as transceivers for transmitting and receiving electromagnetic signals carried by the waveguide 1206. Data encoded in electromagnetic signals that are received by the first photonic node 1202 are encoded in an electromagnetic signal $\lambda_1$, and data encoded in electromagnetic signals that are received by the second photonic node 1204 are encoded in an electromagnetic signal $\lambda_2$. The electromagnetic signals $\lambda_1$ and $\lambda_2$ may be generated by multi-channel lasers (not shown) and introduced to the waveguide 1206. For example, suppose data generated by the first electronic mosaic 1208 is to be sent to the second electronic mosaic 1210 for processing. The first electronic mosaic 1208 generates the data in the form of electric signals. The first photonic node 1202 receives the electric signals, extracts the electromagnetic signal $\lambda_2$ from the waveguide 1206, encodes the data in the electromagnetic signal $\lambda_2$ to obtain an encoded electromagnetic signal $\vec{\lambda}_2$, which is introduced to the waveguide 1206. The waveguide 1206 transmits the encoded electromagnetic signal $\vec{\lambda}_2$ to the second photonic node 1204, which extracts the encoded electromagnetic signal $\vec{\lambda}_2$ from the waveguide 1206 and encodes the data in electric signals that can be processed by the electronic mosaic 1210.

Various device embodiments for photonic nodes are described below with reference to FIGS. 17-18, and extraction and encoding of electromagnetic signals at photonic nodes are described below with reference to FIG. 19. In alternate embodiments of the present invention, the photonic nodes 1202 and 1204 may each include a multi-channel laser that produces the electromagnetic signals $\lambda_1$ and $\lambda_2$. Multi-channel lasers that can be embedded in photonic devices, such as the photonic nodes 1202 and 1204, are well-known in the art. See e.g., "Electrically pumped hybrid AlGaInAs-silicon evanescent laser," by A. W. Fang et al., *Optics Express* 9203, Vol. 14, No. 20, Oct. 2, 2006.

Figure 13:
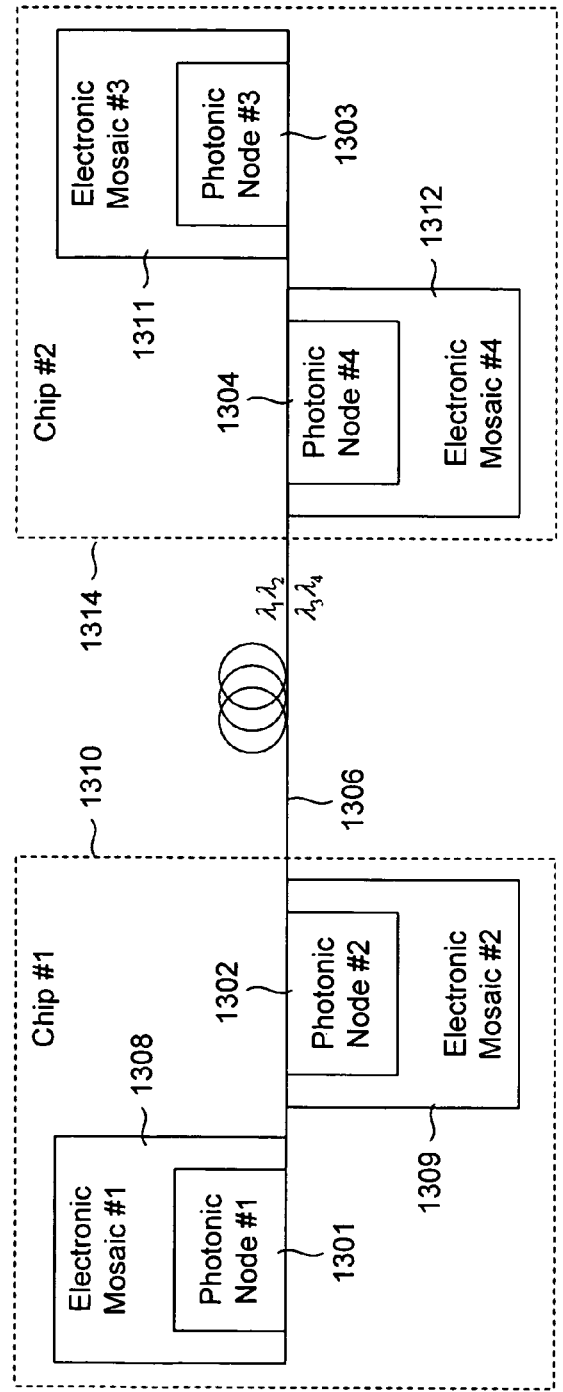
FIG. 13 illustrates a second photonic-based interconnect for interconnecting four electronic mosaics that represents an embodiment of the present invention.

FIG. 13 illustrates a second photonic-based interconnect for interconnecting subsystems of four electronic mosaics that represents an embodiment of the present invention. In FIG. 13, the photonic-based interconnect includes a first photonic node 1301, a second photonic node 1302, a third photonic node 1303, and a fourth photonic node 1304. The photonic nodes 1301-1304 are each interconnected to a single waveguide 1306. The waveguide 1306 can also be a photonic crystal waveguide or an optical fiber ranging in length from about 1 nm to thousands of kilometers. The first and second photonic nodes 1301 and 1302 are coupled to subsystems of the electronic mosaics 1308 and 1309, respectively, which comprise a first chip 1310. The photonic nodes 1303 and 1304 are coupled to subsystems of electronic mosaics 1311 and 1312, respectively, which comprise a second chip 1314.

One or more multi-channel lasers can be used to introduce electromagnetic signals $\lambda_1$, $\lambda_2$, $\lambda_3$, and a to the waveguide 1306, and data can be encoded by the photonic nodes 1301-1304 in the four different electromagnetic signals $\lambda_1$, $\lambda_2$, $\lambda_3$, and $\lambda_4$, respectively. For example, the first photonic node 1301 may receive electric signals encoding data directed from a subsystem of the first electronic mosaic 1308 to a subsystem of the second electronic mosaic 1309. The first photonic node 1301 extracts the electromagnetic signal $\lambda_2$ from the waveguide 1306, encodes the data to obtain encoded electromagnetic signal $\vec{\lambda}_2$, and introduces the encoded electromagnetic signal $\vec{\lambda}_2$ into the waveguide 1306. The second photonic node 1302 extracts the encoded electromagnetic signal $\vec{\lambda}_2$ and encodes the data in electric signals that are transmitted to the subsystem of the second electronic mosaic 1309. Alternatively, subsystems of the electronic mosaics 1308 and 1309 in the first chip 1310 can exchange data with the subsystems of the electronic mosaics 1311 and 1312 in the second chip 1314. For example, the first photonic node 1301 may receive electric signals encoding data that is directed to the subsystem of the fourth electronic mosaic 1312. The first photonic node 1301 extracts the electromagnetic signal $\lambda_4$ from the waveguide 1306 and encodes data to obtain an encoded electromagnetic signal $\vec{\lambda}_4$. The fourth photonic node 1304 extracts the encoded electromagnetic signal $\vec{\lambda}_4$ from the waveguide 1306 and encodes the data in electric signals that are processed by the subsystem of the fourth electronic mosaic 1312.

Figure 14:
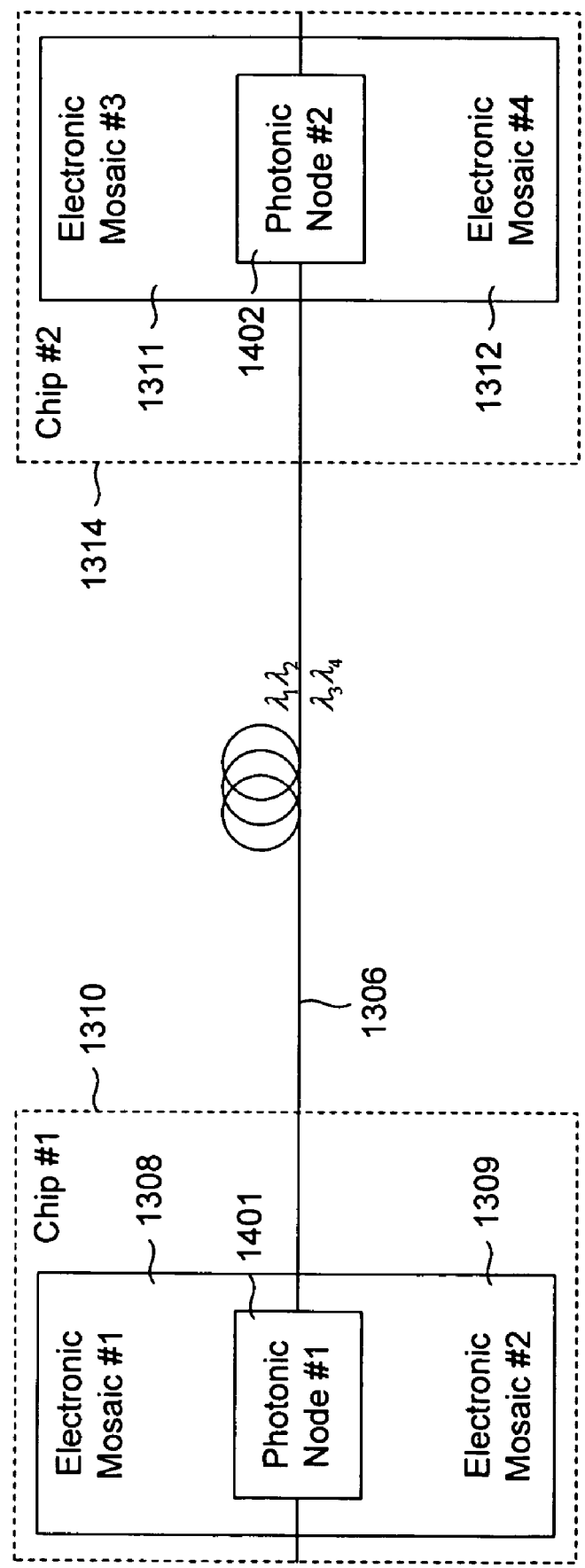
FIG. 14 illustrates a third photonic-based interconnect for interconnecting the four electronic mosaics, shown in FIG. 13, that represents an embodiment of the present invention.

FIG. 14 illustrates a third photonic-based interconnect for interconnecting the subsystems of the four electronic mosaics 1308, 1309, 1311, and 1312, shown in FIG. 13, that represents an embodiment of the present invention. In FIG. 14, the photonic-based interconnect includes a first photonic node 1401 and a second photonic node 1402 that are interconnected to the waveguide 1306. However, unlike the second photonic-based interconnect described above with reference to FIG. 13, subsystems of the first and second electronic mosaics 1308 and 1309 are coupled to the first photonic node 1401, and subsystems of the third and fourth electronic mosaics 1311 and 1312 are coupled the second photonic node 1402. The first photonic node 1401 can be configured to transmit data between the first and second electronic mosaics 1308 and 1309 and to receive and transmit data to the third and fourth electronic mosaics 1311 and 1312 by encoding data in the corresponding electromagnetic signals $\lambda_1$, $\lambda_2$, $\lambda_3$, and $\lambda_4$, as described above with reference to FIG. 13. The second photonic node 1402 can also be configured to transmit data between the third and fourth electronic mosaics 1311 and 1312 and to receive and transmit data to the first and second electronic mosaics 1308 and 1309 by encoding data in the same set of electromagnetic signals $\lambda_1$, $\lambda_2$, $\lambda_3$, and $\lambda_4$.

Figure 15:
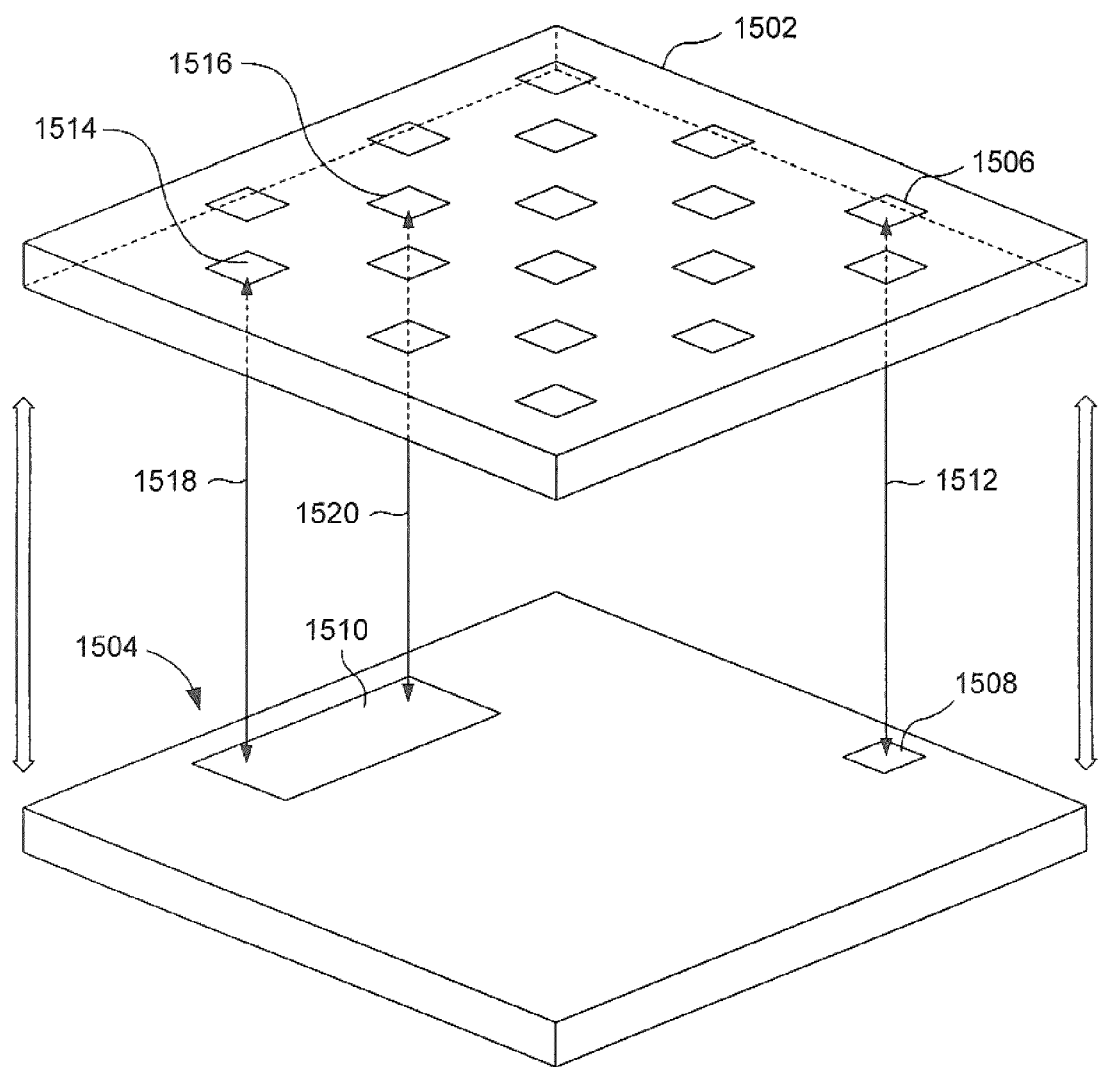
FIG. 15 illustrates a perspective view of a photonic-based interconnect separated from an electronic mosaic that represents an embodiment of the present invention.

FIG. 15 illustrates a perspective view of a photonic-based interconnect 1502 separated from an electronic mosaic 1504 that represents an embodiment of the present invention. In FIG. 15, the photonic-based interconnect 1502 may be a photonic crystal including 18 photonic nodes, such as photonic node 1506. The photonics nodes may be interconnected within the photonic crystal via a network of photonic crystal waveguides (not shown). The photonic-based interconnect 1502 may be mounted on top or the electronic mosaic 1504, which comprises a number of subsystems, such as subsystems 1508 and 1510. The electronic mosaic 1504 can be an ASIC, a FPGA, or any combination of logic cells, memory, and CPUs. One or more of the photonic nodes of the photonic-based interconnect 1502 can be coupled to subsystems of the electronic mosaic 1504. For example, when the photonic-based interconnect brought together with the electronic mosaic 1504, the photonic node 1506 is coupled to the subsystem 1508, as indicated by double-headed directional arrow 1512, and photonic nodes 1514 and 1516 are coupled to the subsystem 1510, as indicated by double-headed directional arrows 1518 and 1520, respectively.

Figure 16:
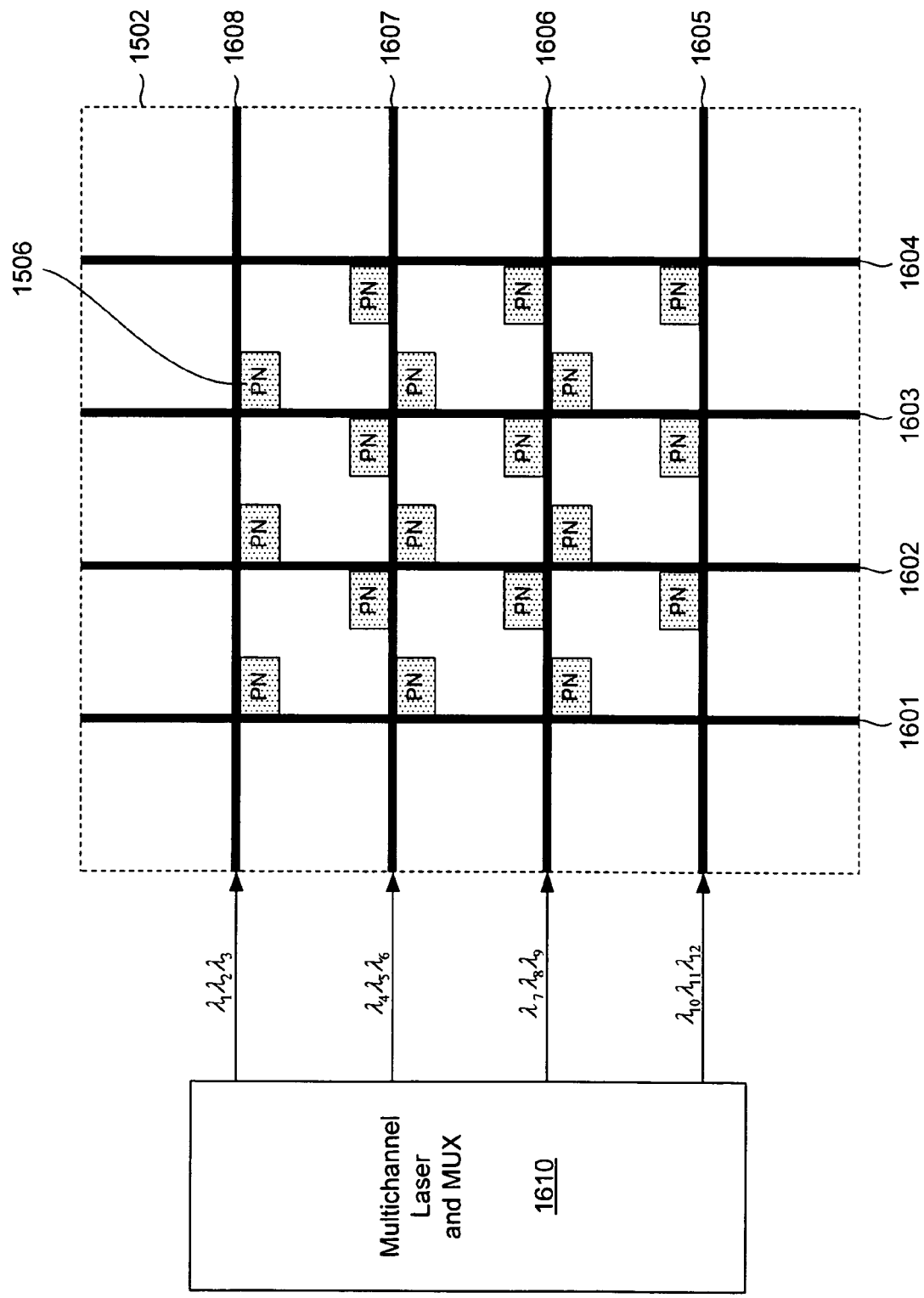
FIG. 16 illustrates a top-view of the photonic-based interconnect, shown in FIG. 15, that represents an embodiment of the present invention.

FIG. 16 illustrates a top-view of the photonic-based interconnect 1502 that represents an embodiment of the present invention. The photonic-based interconnect 1502 includes the 18 photonic nodes and waveguides 1601-1608. Each photonic node can be coupled to either one or two of the waveguides 1601-1608. For example, the photonic node 1506 can be coupled to either or both of the waveguides 1603 and 1608. Each photonic node may be configured to extract one or more of the electromagnetic signals transmitted in a coupled waveguide and introduce into a coupled waveguide one or more encoded electromagnetic signals. One or more multi-channel lasers can be coupled to the waveguides in order to introduce electromagnetic signals that can be used by the photonic nodes to encode data. For example, as shown in FIG. 16, a multi-channel laser 1610 introduces electromagnetic signals 21-23 into the waveguide 1608, electromagnetic signals $\lambda_4$-$\lambda_6$ into the waveguide 1607, electromagnetic signals $\lambda_7$-$\lambda_9$ into the waveguide 1606, and electromagnetic signals 210-212 into the waveguide 1605. The photonic node 1506 may extract the electromagnetic signal $\lambda_3$, encode data generated by the coupled circuit component 1508, shown in FIG. 15, to obtain an encoded electromagnetic signal $\vec{\lambda}_3$. The photonic node 1506 then introduces the encoded electromagnetic signal $\vec{\lambda}_3$ into either or both of the waveguides 1603 and 1608, which can be extracted by another photonic node within the photonic-based interconnect 1502 or transmitted to an optical fiber coupled to the photonic-based interconnect 1502. Coupling an optical fiber to a photonic crystal is described below with reference to FIG. 21. Note that the photonic-based interconnect 1502 described above with reference to FIGS. 15-16 substantially eliminates the need for a global wire bus interconnecting the individual components of the electronic mosaic 1504.

A photonic-node, such as the photonic nodes described above with reference to FIGS. 12-16, may include one or more photonic decoders and one or more photonic encoders. A photonic decoder extracts a specific electromagnetic signal that has been encoded with data, and a photonic encoder extracts a specific electromagnetic signal and encodes data in the electromagnetic signal.

Figure 17:
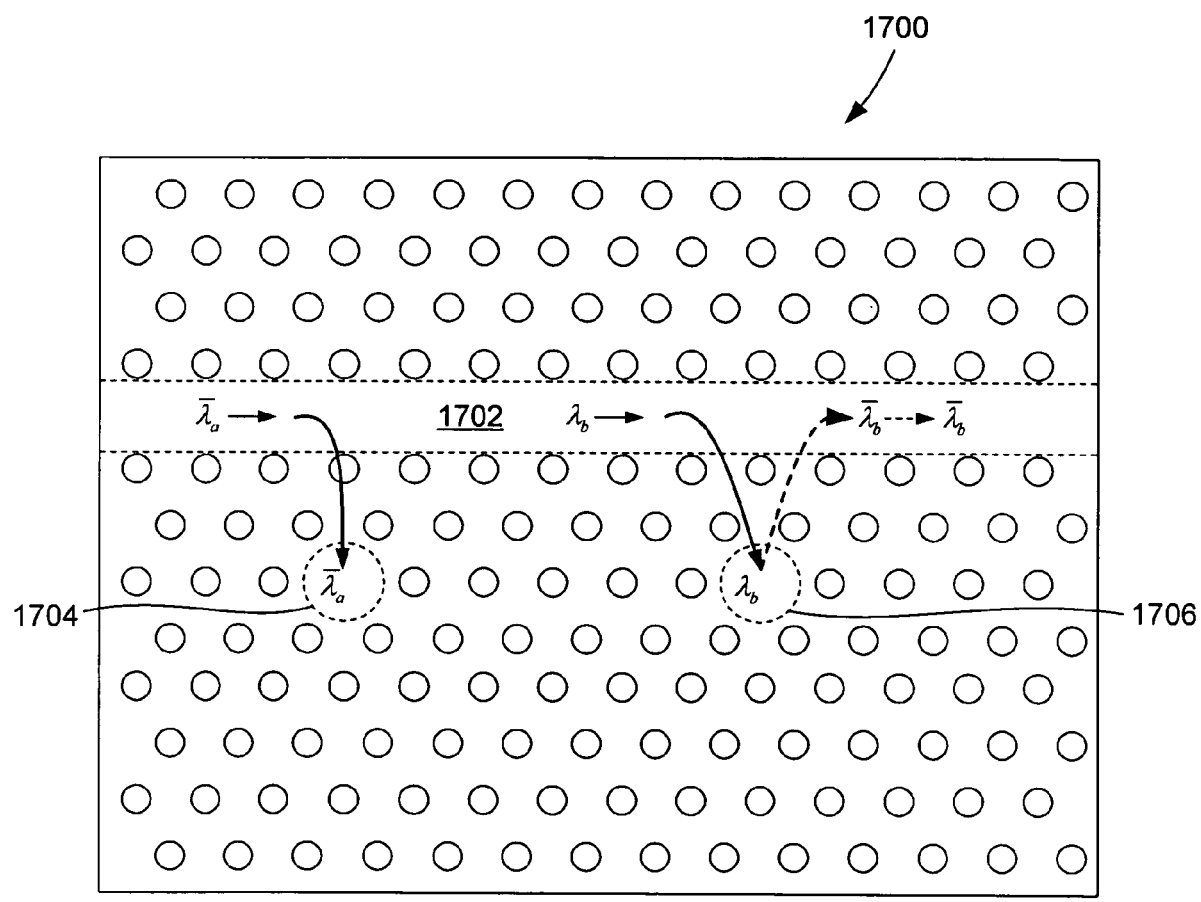
FIG. 17 illustrates a first photonic node that represents an embodiment of the present invention.

FIG. 17 illustrates a first photonic node 1700 comprising a photonic decoder and a photonic encoder located next to a bus waveguide 1702 that represents an embodiment of the present invention. The decoder 1704 comprises a resonant cavity that extracts an encoded electromagnetic signal $\vec{\lambda}_a$ from the waveguide 1702 via evanescent coupling. The decoder 1704 operates as demodulator, described below with reference to FIGS. 20A-20C, by converting fluctuations corresponding to data encoded in the electric field component of the electromagnetic signal $\vec{\lambda}_a$ to electrical signal that can be processes by a coupled subsystem. The encoder 1706 extracts the unencoded electromagnetic signal $\vec{\lambda}_b$ from the waveguide 1702 via evanescent coupling. The encoder 1706 modulates the electric field component of the electromagnetic signal $\lambda_b$ to produce an encoded electromagnetic signal $\vec{\lambda}_b$, as described below with reference to FIGS. 20A-20C. The encoded electromagnetic signal $\vec{\lambda}_b$ is then introduced to the waveguide 1702 via evanescent coupling.

Figure 18:
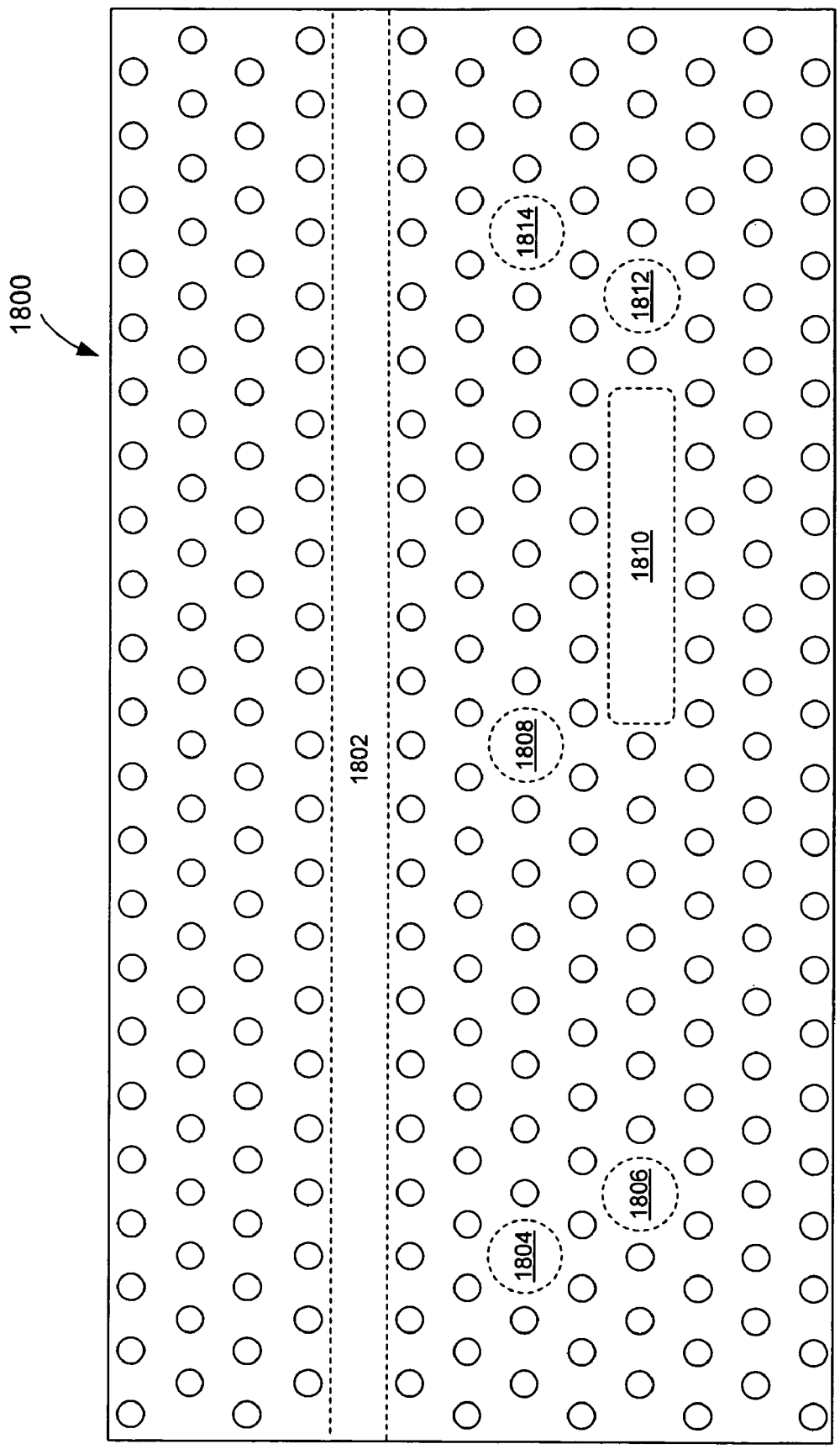
FIG. 18 illustrates a second photonic node that represents an embodiment of the present invention.

FIG. 18 illustrates a second photonic node 1800 comprising a single photonic decoder and a single photonic encoder located next to a bus waveguide 1802 that represents an embodiment of the present invention. The photonic decoder comprises a drop filter 1804 and a detector 1806. The photonic encoder includes a drop filter 1808, a local waveguide 1810, a modulator 1812, and an add filter 1814. Note that the photonic node 1800 can be used to reduce the signal-to-noise ratio. The waveguide 1802 can be coupled to an optical fiber as described below with reference to FIG. 21.

Figure 19:
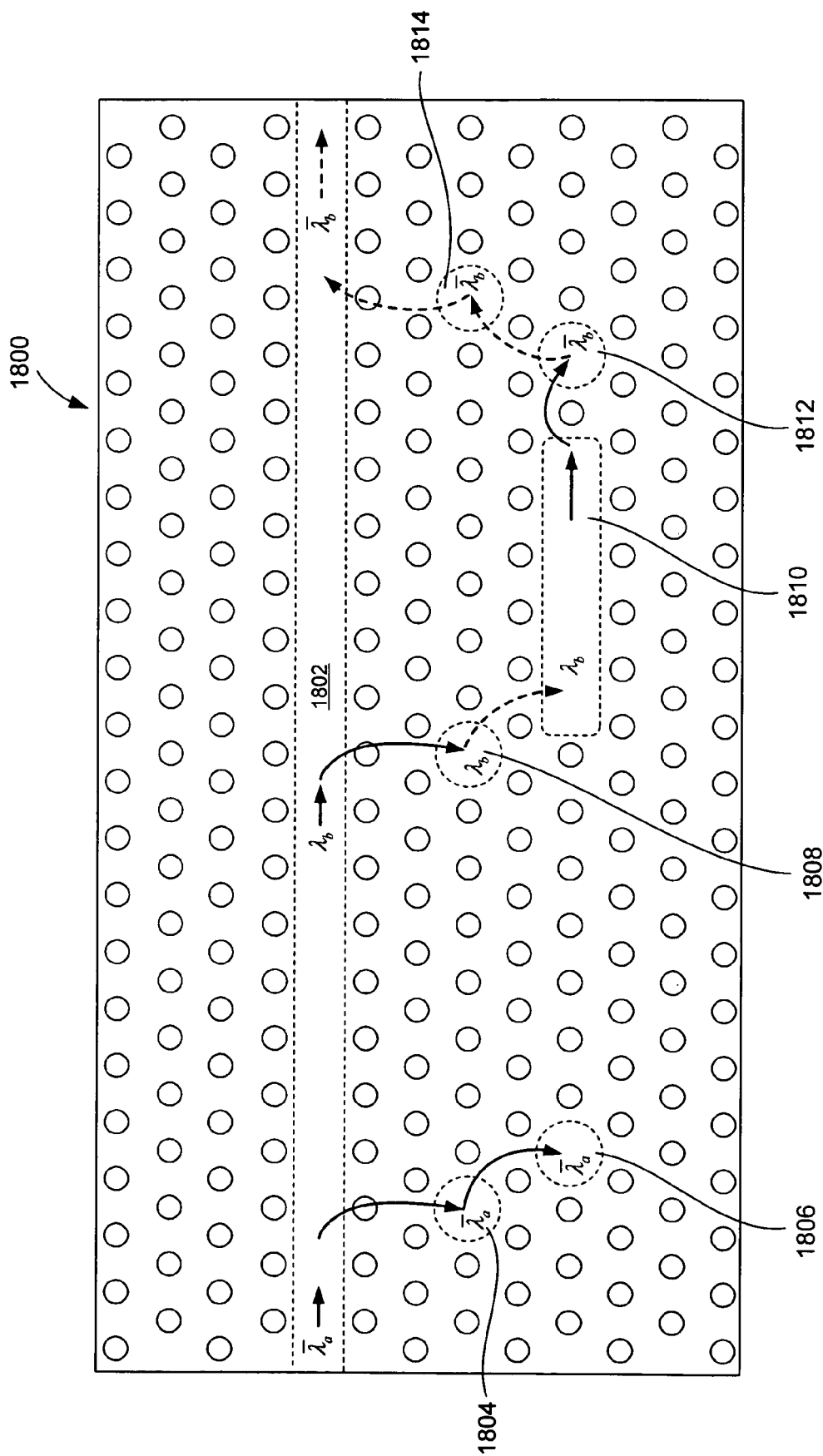
FIG. 19 illustrates operation of the second photonic node, shown in FIG. 18, that represents an embodiment of the present invention.
Figure 20A:
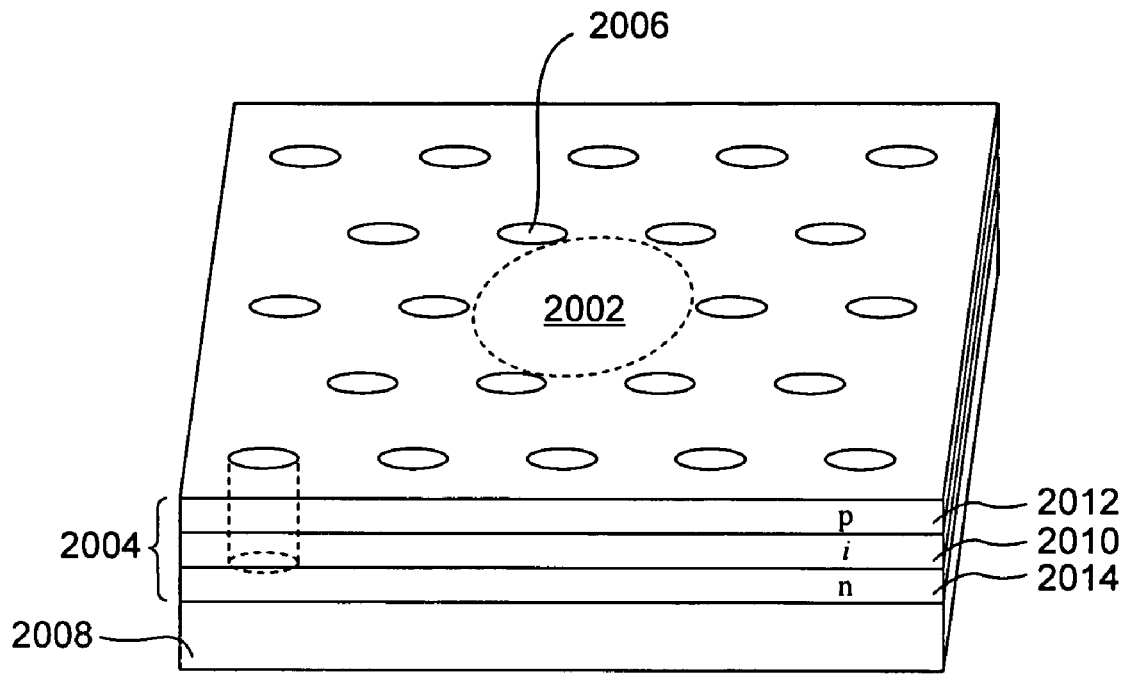
FIG. 20A illustrates a resonant cavity that can be used as either a drop filter or an add filter and that represents one of many embodiments of the present invention.
Figure 20B:
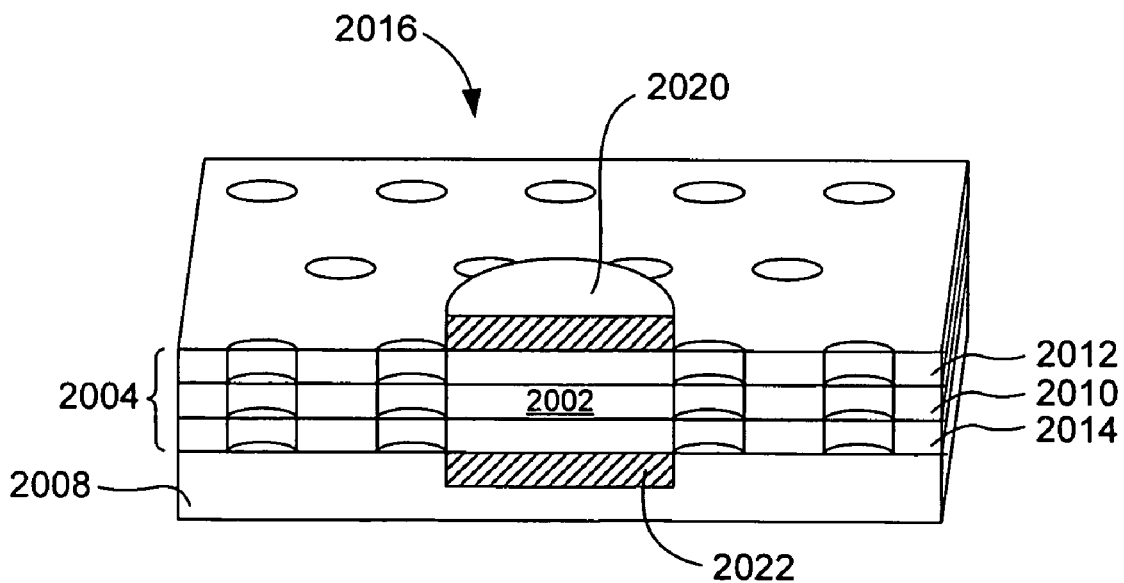
FIG. 20B illustrates a first configuration of a detector/modulator that represents one of many embodiments of the present invention.
Figure 20C:
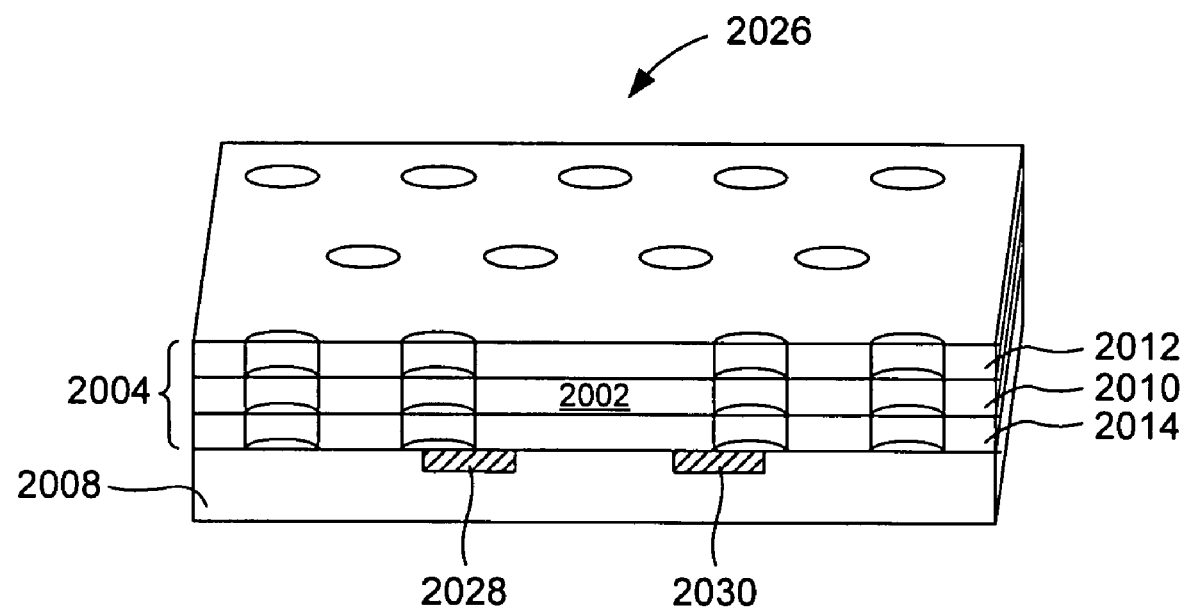
FIG. 20C illustrates a second configuration of a detector/modulator that represents one of many embodiments of the present invention.

FIG. 19 illustrates operation of the second photonic node 1800 for a hypothetically encoded electromagnetic signal $\vec{\lambda}_a$ and a hypothetically unencoded electromagnetic signal $\lambda_b$ that represents an embodiment of the present invention. The photonic decoder operates as follows. The drop filter 1804 is a resonant cavity that is configured to extract the encoded electromagnetic signal $\vec{\lambda}_a$ via evanescent coupling from the bus waveguide 1802. The encoded electromagnetic signal $\vec{\lambda}_a$ is transmitted via evanescent coupling from the drop filter 1804 into the demodulator 1806. The demodulator 1806, described below with reference to FIGS. 20A-20C, is a resonant cavity including photodetectors for detecting the data encoded in the electric field component of the encoded electromagnetic signal $\vec{\lambda}_a$. The photonic encoder operates as follows. The drop filter 1808 is a resonant cavity that is configured to extract the electromagnetic signal $\lambda_b$ via evanescent coupling from the bus waveguide 1802. The electromagnetic signal $\lambda_b$ is transmitted via evanescent coupling into the local waveguide 1810 and into the modulator 1812. The modulator 1812 is a resonant cavity, described below with reference to FIGS. 20A-20C, that generates a data encoded electromagnetic signal $\vec{\lambda}_b$ by modulating the electromagnetic signal $\lambda_b$ in accordance with the data received by a coupled electronic mosaic. The add filter 1814 is a resonant cavity that extracts the encoded electromagnetic signal $\vec{\lambda}_b$ via evanescent coupling from the modulator 1812 and introduces the encoded electromagnetic signal $\vec{\lambda}_b$ into the bus waveguide 1802.

In general, the drop filters and the add filters of photonic encoders and photonic decoders are positioned within a range of evanescent fields emanating from a waveguide. Both drop and add filter diameters and distances to the waveguide can be selected so that associated resonant cavities are resonators for specific wavelengths of electromagnetic signals carried by the waveguide. The dielectric constant of the photonic crystal slab, and the spacing and/or size of the lattice of cylindrical holes surrounding each resonator cavity can be selected so that the drop filters 1804 and 1808 can only extract certain electromagnetic signals. In order to provide strong couplings between a waveguide and drop and add filters, the resonant cavities can be fabricated with high Q factors, such as a Q factor of about 1,000 or larger. For example, the resonant cavities associated with the drop filters 1804 and 1808, shown in FIGS. 18-19, are dimensioned and positioned near the bus waveguide 1802 to extract and confine the electromagnetic signals $\vec{\lambda}_a$ and $\lambda_b$, respectively, and the add filter 1814 is dimensioned and located near the bus waveguide 1802 to introduce the encoded electromagnetic signal $\vec{\lambda}_b$ into the bus waveguide 1802. The local waveguide 1810, is located near the modulator 1812 so that a large fraction of the electromagnetic signal $\lambda_b$ can be transmitted via evanescent coupling into the resonant cavity of the modulator 1812. The modulator 1812 is also dimensioned and positioned to create a strong evanescent coupling with the add filter 1814.

Drop filters and add filters can be fabricated using a variety of different defects in a photonic crystal. FIG. 20A illustrates a resonant cavity that can be used as a resonant cavity for a drop filter, an add filter, a modulator, and a detector that represents one of many embodiments of the present invention. In FIG. 20A, a resonant cavity 2002 can be created by omitting a cylindrical hole within a regular triangular grid of cylindrical holes in a photonic crystal slab 2004. The diameter of the resonant cavity 2002 and the pattern and diameter of cylindrical holes surrounding the resonant cavity 2002, such as cylindrical hole 2006, can be selected to temporarily trap a specific electromagnetic signal with the resonant cavity 2002. A resonant cavity may also be fabricated using a cylindrical hole having a diameter that is different from the diameter of the surrounding cylindrical holes, and/or filling a cylindrical hole with a dielectric material different from the dielectric material of the photonic crystal. The photonic crystal slab 2004 is located on top of a glass substrate 2008 and may be comprised an intrinsic layer 2010 that is located between a positively doped semiconductor layer 2012 and a negatively doped semiconductor layer 2014. The layers 2010, 2012, and 2014 comprise a single photonic-crystal layer called a "p-i-n" layer. The dopant concentrations of the p-i-n layers can be any combination of Si, SiO, $SiO_2$, InGaAs, or any other suitable dopants.

Demodulators and modulators can be fabricated at resonant cavities from a variety of different materials. FIG. 20B illustrates a first configuration of a demodulator/modulator that represents one of many embodiments of the present invention. A demodulator/modulator 2016 can be fabricated using a resonant cavity, such as the resonant cavity 2002, sandwiched between two electrodes 2020 and 2022. The layer 2004 can be comprised of the p-i-n layers, described above with reference to FIG. 20A, or a single layer, such as a single semiconductor layer of lithium niobate, $LiNbO_3$. The electrode 2020 is in contact with the semiconductor layer 2012, and the electrode 2022 is in contact with the semiconductor layer 2014. In order for the demodulator/modulator 2016 to operate as a demodulator, the electrodes 2020 and 2022 collect a varying electrical current generated by variations in the intensity, phase, and/or amplitude of the electric field component of an electromagnetic signal resonating in the resonant cavity 2002. The varying electrical current represents a data stream that can be transmitted from the electrodes 2020 and 2022 to a coupled electronic mosaic. The semiconductor layers 2012 and 2014 may have different dopant concentrations or dopant types so that the demodulator/modulator 2016 can be operated as a modulator for encoding data in an electromagnetic signal. By varying a voltage across the resonant cavity 2002 the frequency or amplitude of the electric field component of an electromagnetic signal resonating in the resonant cavity 2002 is changed to encode the data.

FIG. 20C illustrates a second configuration of a demodulator/modulator that represents one of many embodiments of the present invention. Demodulator/modulator 2026 includes the resonant cavity 2002 and two electrodes 2028 and 2030 that are both located under the resonant cavity 2002. The layer 2004 can be comprised of the p-i-n layers, described above with reference to FIG. 20A, or a single semiconductor layer, such as a single layer of lithium niobate, $LiNbO_3$. The demodulator/modulator 2026 operates as a demodulator by detecting variations at the electrodes 2028 and 2030 in the intensity, phase, and/or amplitude of the electric field component of an electromagnetic signal resonating in the resonant cavity 2002. The demodulator/modulator 2026 operates as a modulator by varying a voltage applied to the electrodes 2028 and 2030 that, in turn, changes the dielectric constant of the dielectric materials in the resonant cavity 2002 causing a phase and/or amplitude change in the electric field component of an electromagnetic signal resonating in the resonant cavity 2002.

The intrinsic capacitance in demodulator electrode detectors is often low enough that fluctuations in current due to noise generated by thermal agitation of electrons in a conductor, called "Johnson noise," may be insignificant. As a result, statistics associated with an electromagnetic signal source dominate the bit error rate ("BER") arising in the serial digital signal corresponding to the output from the detector. For example, a Poisson distribution of an electromagnetic signal having 30 photons per bit is sufficient to achieve a BER of less than $10^{-13}$. Incorporating a doped region into a resonant cavity with a Q factor of 10 to 100 may compensate for the reduced absorption. With an appropriate choice of Q factor to impedance-match, the optical input losses of the cavity to the internal absorption loss of the detector may increase detection efficiency. For example, an increase in the detection efficiency of about 50% may be achieved.

Similar considerations can be applied to the design of a resonant cavity enhanced ("RCE") modulator using electro-optic or current injection techniques. Modulation depths as high as 50% may be achieved for a resonant cavity with a Q factor greater than about 1,000. Although other physical effects can be employed, such as variations in the free carrier plasma index, electro-optic modulation can be used with a potential difference of about 30 mV applied across a gap of about 300 nm to produce an electric field of 1 kV/cm, which is sufficient to generate a refractive index change as large as 0.001 in a wide variety of linear dielectric materials.

Figure 21:
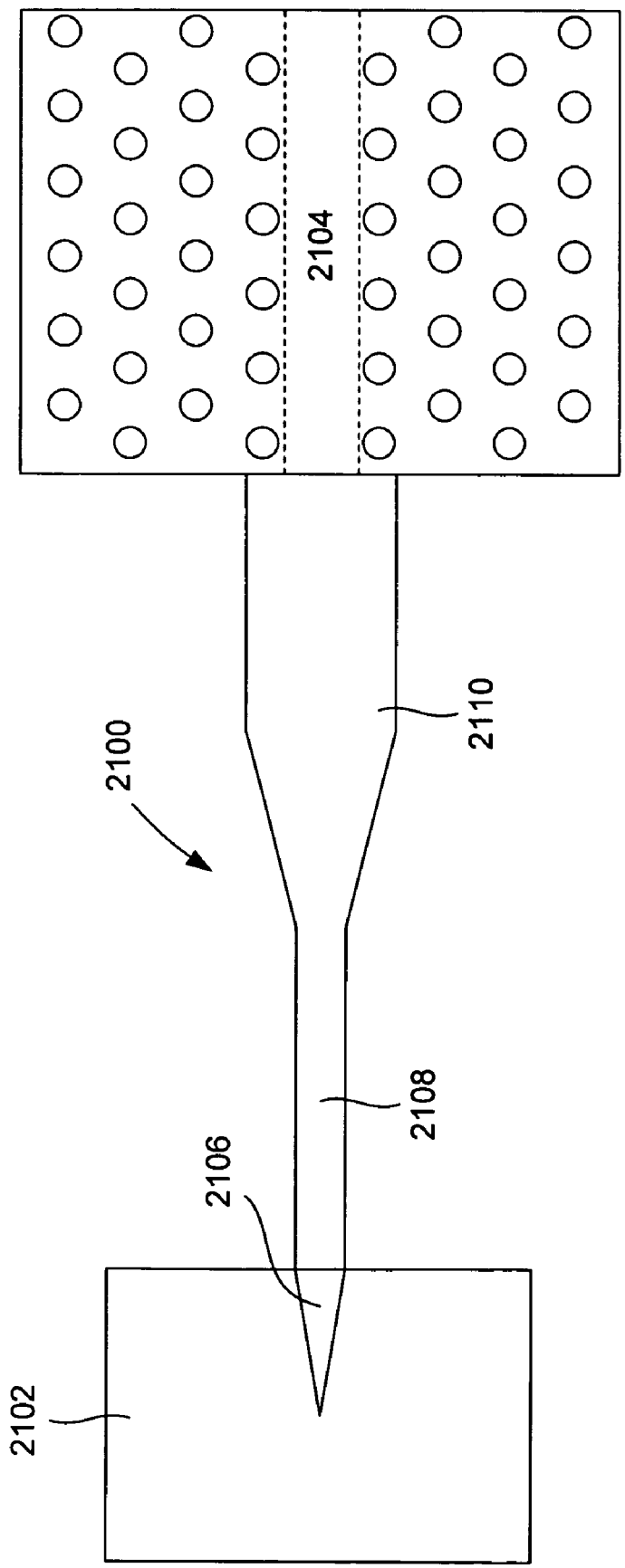
FIG. 21 illustrates an optical fiber-to-waveguide coupler.

FIG. 21 illustrates an optical fiber-to-waveguide coupler 2100 that couples an optical fiber 2102 to a photonic crystal waveguide 2104. The fiber-to-waveguide coupler 2100 comprises a tapered end 2106 embedded in the end of the optical fiber 2102. The fiber-to-waveguide coupler 2100 widens to a single-mode strip waveguide 2108 and then widens again into a butt coupler 2108, which abuts the waveguide 2104. The coupler 2100 is comprised of a material having a higher refractive index than the optical fiber 2102. As a result, electromagnetic signals propagating in the optical fiber 2102 may be evanescently coupled into or out of the fiber-to-waveguide coupler 2100 at the tapered end 2106. The fiber-to-waveguide coupler 2100 can be supported by a transparent material, such as $SiO_2$. See e.g., "Ultra-low loss photonic integrated circuit with membrane-type photonic crystal waveguides," by S. J. McNab et al., *Optics Express* 2927, Vol. 11, No. 22, Nov. 3, 2003.

Figure 22:
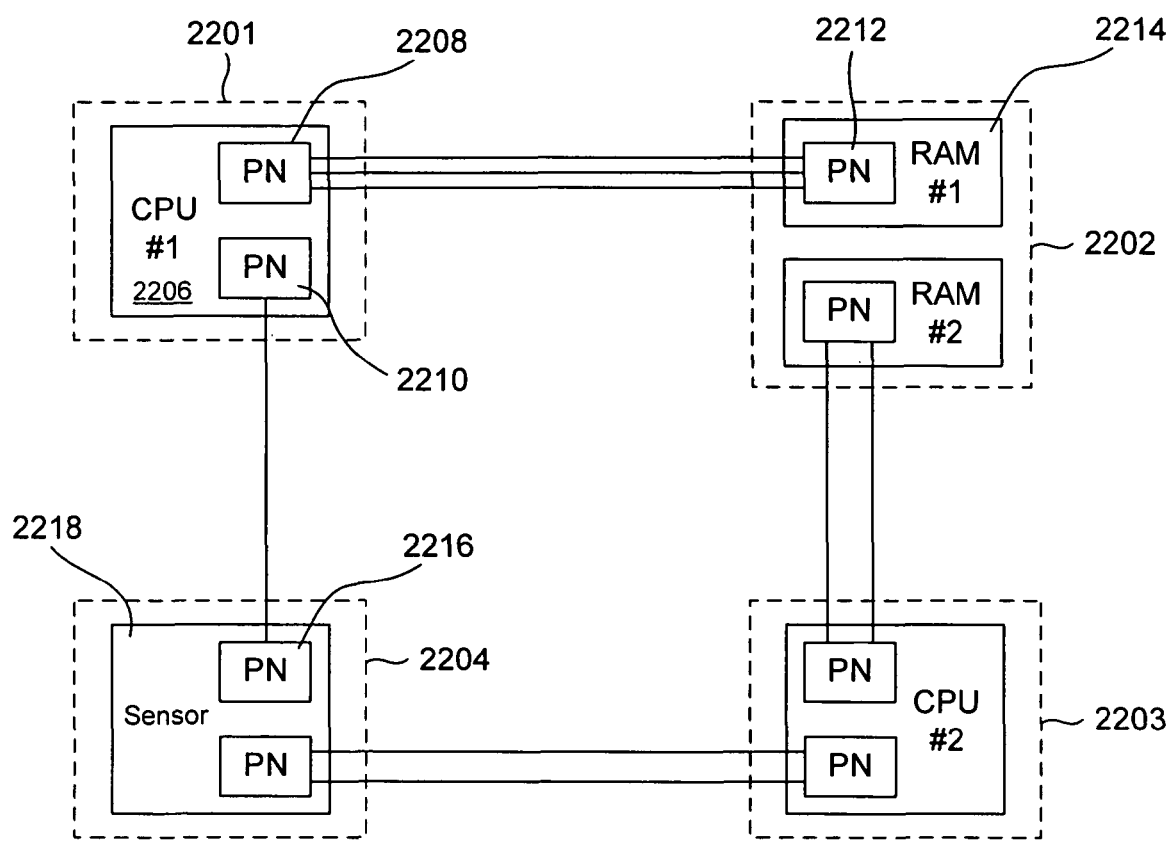
FIG. 22 illustrates a network comprising four chips interconnected via photonic-based interconnects that represents an embodiment of the present invention.

Although the present invention has been described in terms of particular embodiments, it is not intended that the invention be limited to these embodiments. Modifications within the spirit of the invention will be apparent to those skilled in the art. In an alternate embodiment of the present invention, those skilled in the art would recognize that a large number of the chips described above with reference to FIGS. 12-16 can be coupled to form a network of electronic mosaics interconnect by a photonic-based interconnect. FIG. 22 illustrates a network 2200 comprising four chips 2201-2204 interconnected via photonic-based interconnects that represents an embodiment of the present invention. Subsystems of the chips 2201-2204 are interconnected by waveguides, such as photonic crystal waveguides or optical fibers. For example, CPU 2206 is coupled to photonic nodes 2208 and 2210. The photonic node 2208 is interconnected to the photonic node 2212, which is coupled to RAM 2214, and the photonic node 2210 is interconnected to the photonic node 2216, which is coupled to sensor 2218. Note that the number of waveguides needed to interconnect the photonic nodes is based on the bandwidth requirements for transmitting electromagnetic signals between the corresponding coupled subsystems. For example, four waveguides are used to interconnect the photonic nodes 2208 and 2212, and a single waveguide is used to interconnect the photonic node 2210 to the photonic node 2216.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A photonic-based interconnect for interconnecting subsystems of electronic mosaics, the photonic-based interconnect comprising:
   a first photonic node coupled directly to a subsystem of a first electronic mosaic and configured to transmit electromagnetic signals encoding data generated by the subsystem of the first electronic mosaic to a second electronic mosaic and receive electromagnetic signal encoding data generated by one or more subsystems of the second electronic mosaic;
   a second photonic node coupled directly to a subsystem of the second electronic mosaic and configured to transmit electromagnetic signals encoding data generated by the subsystem of the second electronic mosaic to the first electronic mosaic and receive electromagnetic signals encoding data generated by one or more subsystems of the first electronic mosaic; and
   a bus waveguide coupled to both the first photonic node and the second photonic node and configured to transmit electromagnetic signals between the first photonic node and the second photonic node.

2. The photonic-based interconnect of claim 1 wherein both the first and the second photonic nodes further comprise one or more drop filters and one or more add filters.

3. The photonic-based interconnect of claim 1 wherein the first and the second photonic nodes further comprise photonic crystals.

4. The photonic-based interconnect of claim 1 wherein the subsystems of the first and the second electronic mosaics further comprise one or more of:
   a central processing unit;
   memory;
   a logic cell; and
   a sensor.

5. The photonic-based interconnect of claim 1 wherein the electromagnetic signal encodes data in one of:
   frequency;
   amplitude; and
   wavelength.

6. The photonic-based interconnect of claim 1 wherein the waveguide further comprises one of:
   an optical fiber;
   a ridge waveguide; and
   a photonic crystal waveguide.

7. The photonic-based interconnect of claim 1 further comprising a multi-channel laser configured to generate one or more electromagnetic signals.

8. The photonic-based interconnect of claim 1 wherein the first and the second photonic nodes further comprise multi-channel lasers configured to generate one or more electromagnetic signals.

9. A photonic-based interconnect comprising:
- a bus waveguide configured to transmit a number of electromagnetic signals; and
- a photonic node coupled to the bus waveguide and a subsystem of an electronic mosaic, the photonic node including:
  - a photonic decoder configured to extract a first of the number of electromagnetic signals from the bus waveguide and transmit data encoded in the first electromagnetic signal to the subsystem of the electronic mosaic for processing, and
  - a photonic encoder configured to extract a second of the number of electromagnetic signals from the bus waveguide and encode in the second electromagnetic signal data generated by the subsystem of the electronic mosaic, wherein the first electromagnetic signal is different from the second electromagnetic signal.

10. The photonic-based interconnect of claim 9 wherein both the photonic decoder and photonic encoder further comprise one or more drop filters and one or more add filters.

11. The photonic-based interconnect of claim 9 wherein the photonic node further comprises a photonic crystal.

12. The photonic-based interconnect of claim 9 wherein the subsystem of the electronic mosaic further comprise one of:
- a central processing unit;
- memory;
- a logic cell; and
- a sensor.

13. The photonic-based interconnect of claim 9 wherein the electromagnetic signal encodes data in one of:
- frequency;
- amplitude; and
- wavelength.

14. The photonic-based interconnect of claim 9 further comprising a multi-channel laser configured to generate one or more electromagnetic signals.

15. A method for transmitting data generated by a first subsystem of a first electronic mosaic to a second subsystem of a second electronic mosaic, the method comprising:
- transmitting an electromagnetic signal in a waveguide;
- extracting the electromagnetic signal from the waveguide by a first photonic node coupled directly to the first subsystem;
- modulating the electromagnetic signal to produce an encoded electromagnetic signal encoding the data generated by the first subsystem of the first electronic mosaic;
- introducing the encoded electromagnetic signal into the waveguide;
- extracting the encoded electromagnetic signal from the waveguide by a second photonic node coupled directly to the second subsystem; and
- demodulating the encoded electromagnetic signal to produce an electrical signal encoding the data that can be processed by the second subsystem of the second electronic mosaic.

16. The method of claim 15 where in extracting the electromagnetic signal from the waveguide further comprises evanescent coupling the electromagnetic signal into a first drop filter.

17. The method of claim 15 wherein modulating the electromagnetic signal further comprises evanescently coupling the electromagnetic signal into a resonant cavity and applying a voltage across the resonant cavity.

18. The method of claim 15 wherein introducing the encoded electromagnetic signal further comprises evanescent coupling the electromagnetic signal into the waveguide.

19. The method of claim 15 wherein extracting the encoded electromagnetic signal further comprises further comprises evanescent coupling the electromagnetic signal into a second drop filter.

20. The method of claim 15 wherein demodulating the encoded electromagnetic signal, further comprises evanescently coupling the electromagnetic signal into a second resonant cavity and detecting variation in voltages created by an electric field component of the encoded electromagnetic signal.

* * * * *

UNITED STATES PATENT AND TRADEMARK OFFICE
CERTIFICATE OF CORRECTION

| | |
|---|---|
| PATENT NO. | : 7,894,699 B2 |
| APPLICATION NO. | : 11/582207 |
| DATED | : February 22, 2011 |
| INVENTOR(S) | : Raymond G. Beausoleil |

It is certified that error appears in the above-identified patent and that said Letters Patent is hereby corrected as shown below:

On the title page, in item (54), Title, in column 1, line 1,
delete "PHOTONIC BASED" and insert -- PHOTONIC-BASED --, therefor.

In column 1, line 1, delete "PHOTONIC BASED" and insert -- PHOTONIC-BASED --, therefor.

In column 13, line 62, after "interconnect" insert -- 1502 is --.

In column 20, line 19, in Claim 16, delete "where in" and insert -- wherein --, therefor.

Signed and Sealed this
Twenty-sixth Day of July, 2011

David J. Kappos
*Director of the United States Patent and Trademark Office*